US010481773B2

(12) United States Patent
Iwaizumi et al.

(10) Patent No.: US 10,481,773 B2
(45) Date of Patent: *Nov. 19, 2019

(54) MOBILE TERMINAL, MEMORY, AND FOLDER CONTROL METHOD

(71) Applicant: KYOCERA CORPORATION, Kyoto (JP)

(72) Inventors: Tomoki Iwaizumi, Osaka (JP); Keisuke Nagata, Kobe (JP)

(73) Assignee: KYOCERA CORPORATION, Kyoto (JP)

( * ) Notice: Subject to any disclaimer, the term of this patent is extended or adjusted under 35 U.S.C. 154(b) by 235 days.

This patent is subject to a terminal disclaimer.

(21) Appl. No.: 15/004,834

(22) Filed: Jan. 22, 2016

(65) Prior Publication Data

US 2016/0139748 A1 May 19, 2016

Related U.S. Application Data

(63) Continuation of application No. PCT/JP2014/069969, filed on Jul. 29, 2014.

(30) Foreign Application Priority Data

Jul. 29, 2013 (JP) .................................. 2013-156693

(51) Int. Cl.
*G06F 3/0482* (2013.01)
*G06F 3/0484* (2013.01)
(Continued)

(52) U.S. Cl.
CPC ........ *G06F 3/04845* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS 7,844,913 B2   11/2010 Amano et al.
8,892,168 B2 * 11/2014 Yang .................. G06F 3/04817
                                               340/689
(Continued)

FOREIGN PATENT DOCUMENTS

EP      2372516 A2    10/2011
JP    2004-229103 A    8/2004
(Continued)

OTHER PUBLICATIONS

First Office Action issued in Japanese Patent Application No. 2013-156693, dated Sep. 17, 2014, and Statement of Relevance of non-English references cited therein, in 6 pages.
(Continued)

*Primary Examiner* — Beau D Spratt
(74) *Attorney, Agent, or Firm* — Duane Morris LLP

(57) ABSTRACT

A mobile terminal includes a display unit on which a tiled object corresponding to a function is displayed and a touch panel located on the display unit. The mobile terminal further includes at least one processor. The at least one processor displays, when a plurality of tiled objects are stored in a folder, display the folder on the display unit. The at least one processor displays an image representing a tiled object stored in the folder on the display unit in association with the folder. The at least one processor performs, when a touch operation is performed on the folder, a function corresponding to the tiled object represented by the image displayed on the display unit.

10 Claims, 51 Drawing Sheets

(51) Int. Cl.
*G06F 3/0488* (2013.01)
*G06F 3/0481* (2013.01)
*G06Q 10/10* (2012.01)

(52) U.S. Cl.
CPC ........ *G06F 3/0488* (2013.01); *G06F 3/04817* (2013.01); *G06F 3/04842* (2013.01); *G06F 3/04883* (2013.01); *G06F 3/04886* (2013.01); *G06Q 10/107* (2013.01)

(56) References Cited

U.S. PATENT DOCUMENTS

| | | | |
|---|---|---|---|
| 9,953,101 B1* | 4/2018 | Walliser | G06F 17/30905 |
| 2005/0120306 A1* | 6/2005 | Klassen | G06F 3/04817 |
| | | | 715/765 |
| 2009/0106674 A1* | 4/2009 | Bray | G06F 3/0481 |
| | | | 715/762 |
| 2010/0138763 A1 | 6/2010 | Kim | |
| 2011/0246918 A1 | 10/2011 | Henderson | |
| 2011/0252350 A1* | 10/2011 | Chaudhri | G06F 3/04817 |
| | | | 715/769 |
| 2012/0030623 A1 | 2/2012 | Hoellwarth | |
| 2012/0192110 A1* | 7/2012 | Wu | G06F 3/04817 |
| | | | 715/815 |
| 2012/0304106 A1* | 11/2012 | LeVee | G06F 3/0481 |
| | | | 715/781 |
| 2013/0024794 A1* | 1/2013 | Ha | G06F 3/0485 |
| | | | 715/765 |
| 2013/0265284 A1* | 10/2013 | Yun | G06F 3/0416 |
| | | | 345/175 |
| 2013/0311920 A1* | 11/2013 | Koo | G06F 3/04883 |
| | | | 715/765 |
| 2013/0332886 A1* | 12/2013 | Cranfill | G06F 3/0482 |
| | | | 715/835 |
| 2014/0331187 A1* | 11/2014 | Hicks | G06F 3/0488 |
| | | | 715/845 |
| 2015/0326752 A1 | 11/2015 | Hayasaki | |

FOREIGN PATENT DOCUMENTS

| | | |
|---|---|---|
| JP | 2005-202482 A | 7/2005 |
| JP | 2005-202483 A | 7/2005 |
| JP | 2005-202484 A | 7/2005 |
| JP | 2006-081129 A | 3/2006 |
| JP | 2007-189547 A | 7/2007 |
| JP | 2010-199717 A | 2/2009 |
| JP | 2013-041459 A | 8/2011 |
| JP | 2012-008916 A | 1/2012 |
| JP | 2014-010576 A | 11/2015 |
| WO | WO 2012/153992 A2 | 11/2012 |

OTHER PUBLICATIONS

International Search Report in International Application No. PCT/JP2014/069969, dated Aug. 26, 2014, in 2 pages.
Written Opinion in International Application No. PCT/JP2014/069969, dated Aug. 26, 2014, and Statement of Relevance of non-English references cited therein, in 5 pages.
Yahashi, Tsukasa, App Store ni Aru Apuri o Gensen Select! Apuri Lab Deluxe, iPhone Magazine, May 16, 2013, vol. 38, p. 68.

\* cited by examiner

F I G . 1
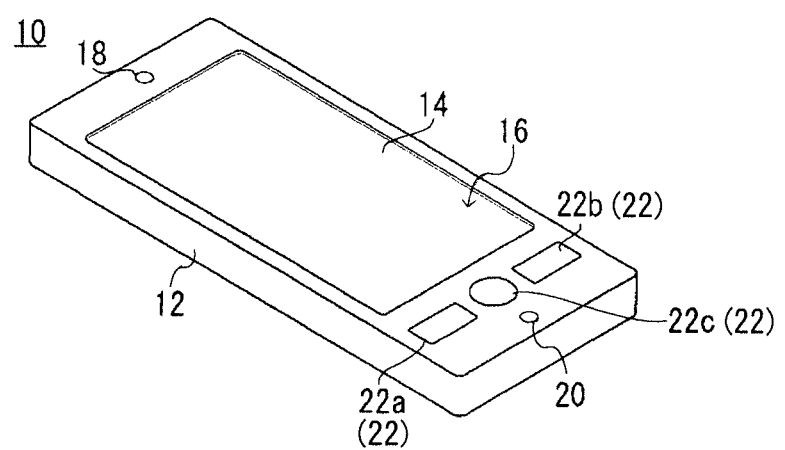

F I G . 2
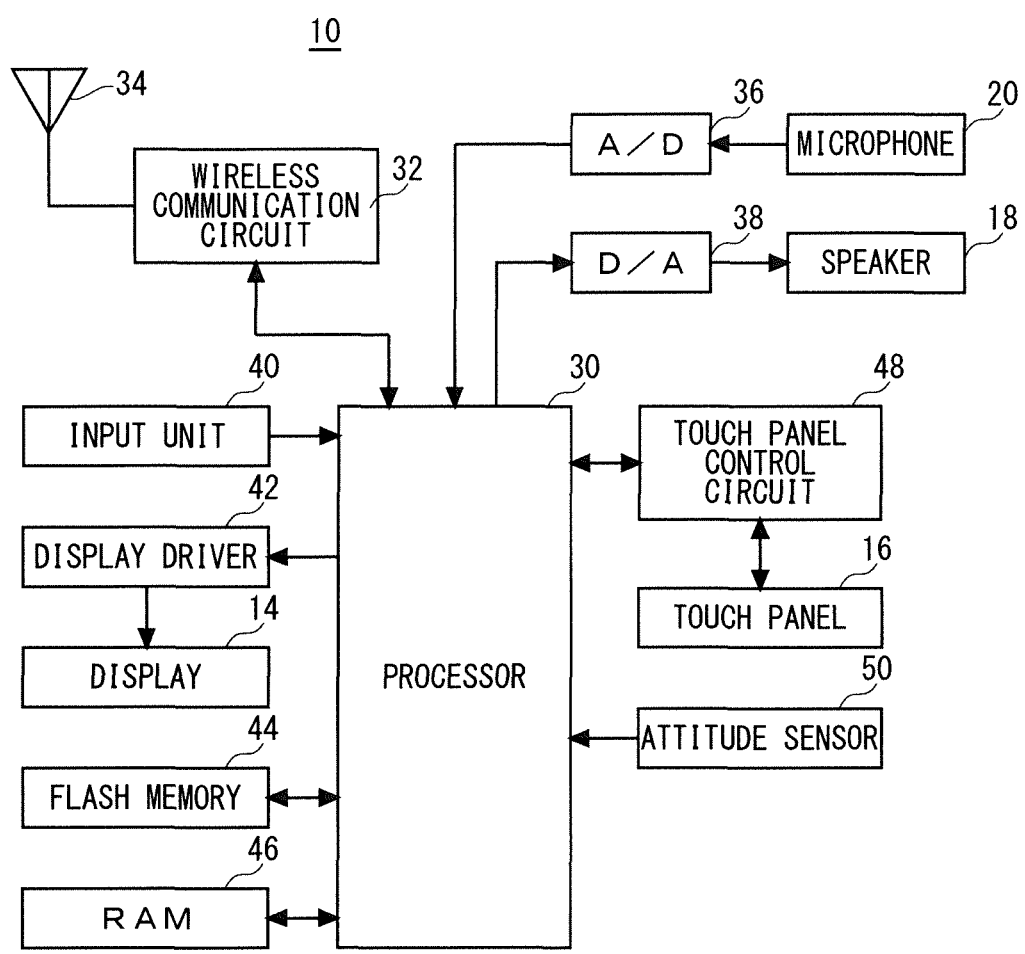

F I G . 4
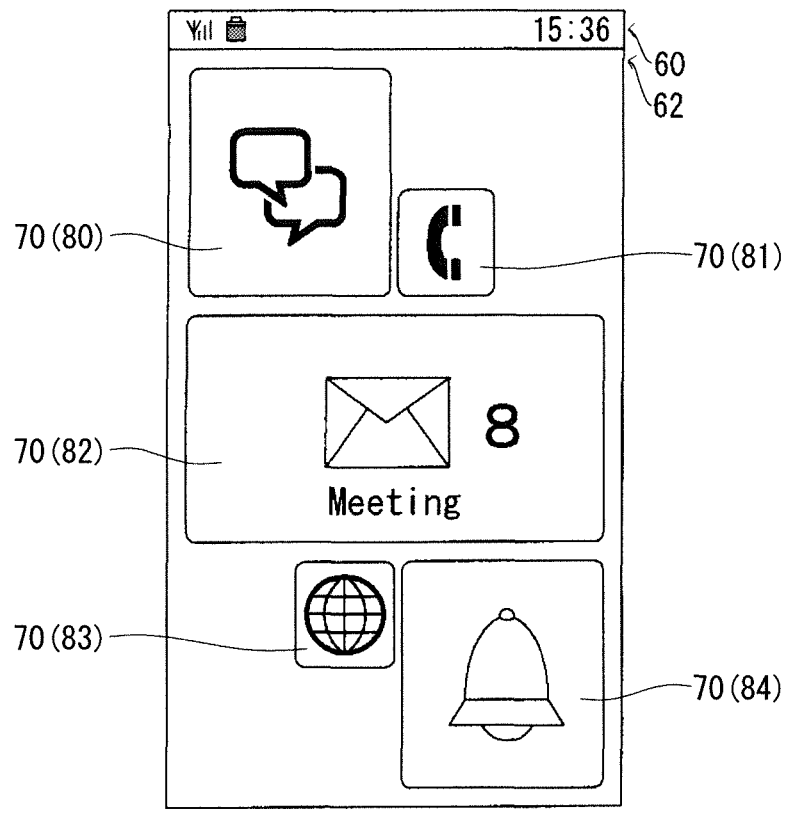

F I G . 9
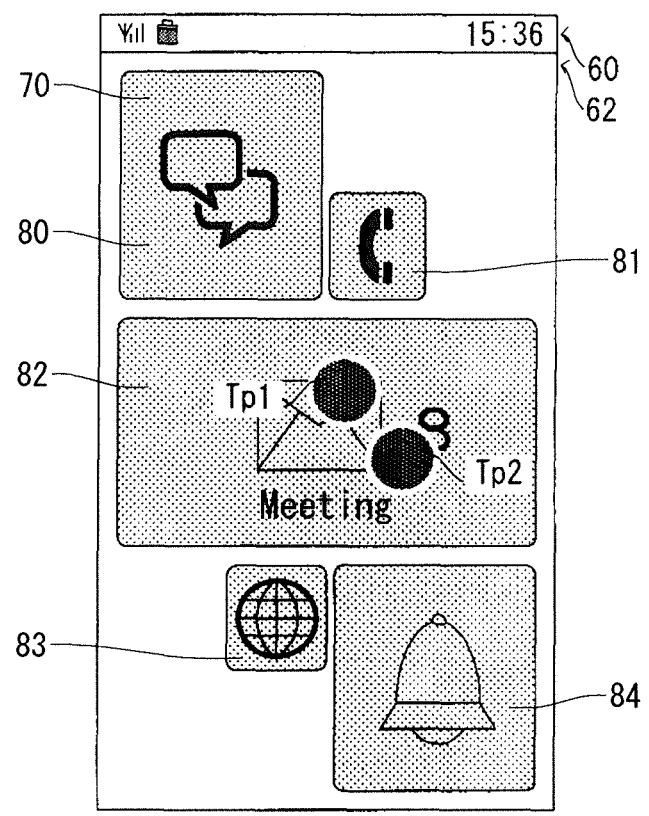

F I G . 1 1
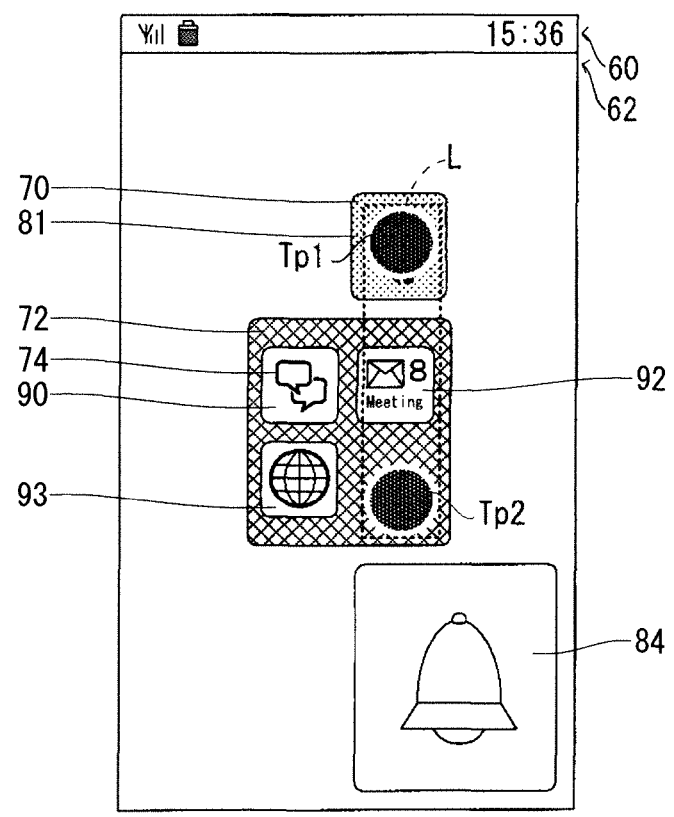

FIG. 14

FOLDER TABLE

| FOLDER ID | NAME | DISPLAY SIZE | DISPLAY POSITION | NUMBER OF TILES | FUNCTIONS | THUMBNAIL IMAGES | | SWITCHING |
|---|---|---|---|---|---|---|---|---|
| | | | | | | FIRST THUMBNAIL IMAGE | ... | |
| 0001 | MAIN | MEDIUM SIZE | $(X_1, Y_1)-(X_2, Y_2)$ | 4 | SNS, EMAIL, ... | SNS/$(X_1, Y_1)-(X_2, Y_2)$ | ... | × |
| | | | ... | | | | | |

F I G. 1 5
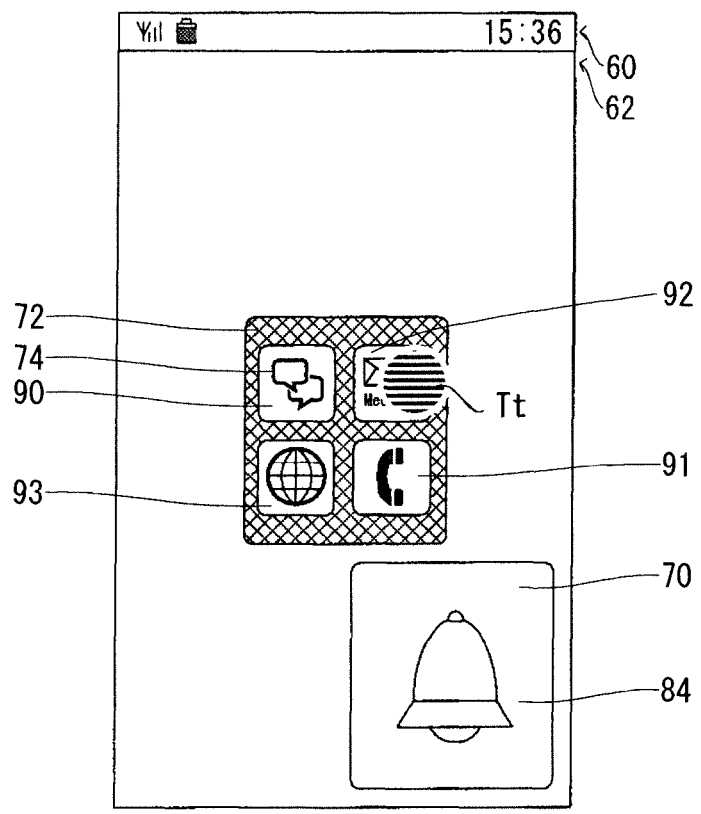

F I G. 1 6
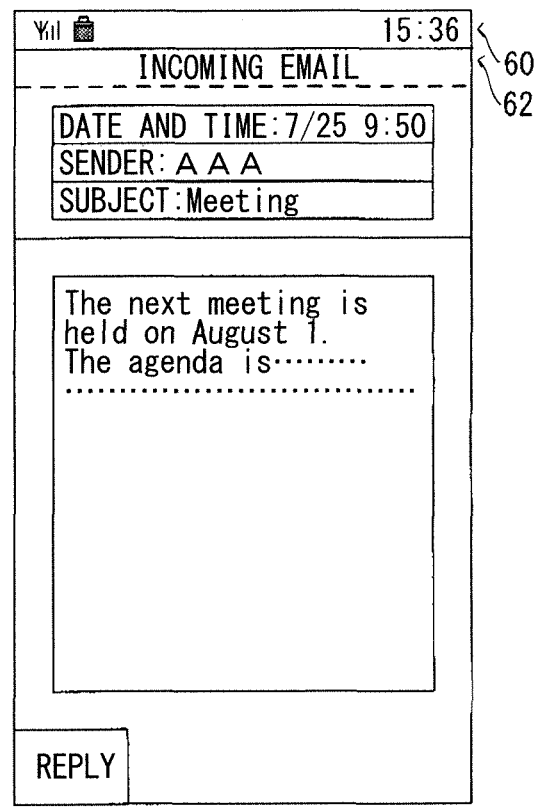

F I G . 1 7
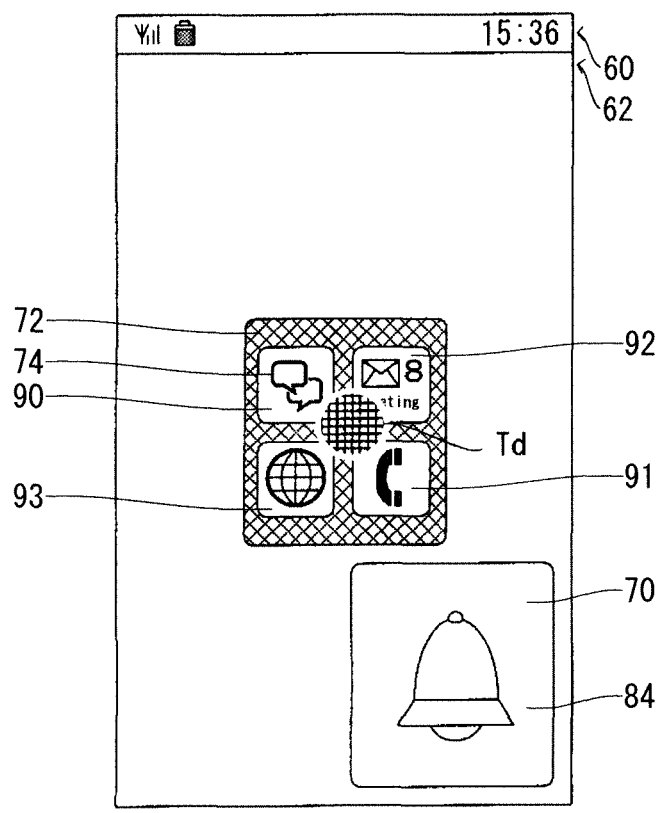

F I G . 3 0
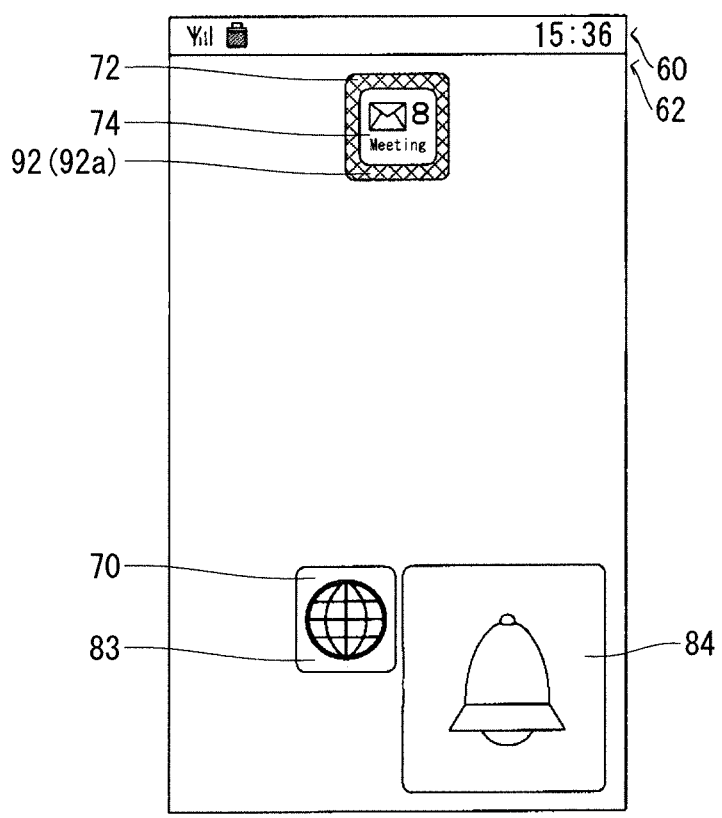

F I G. 3 4
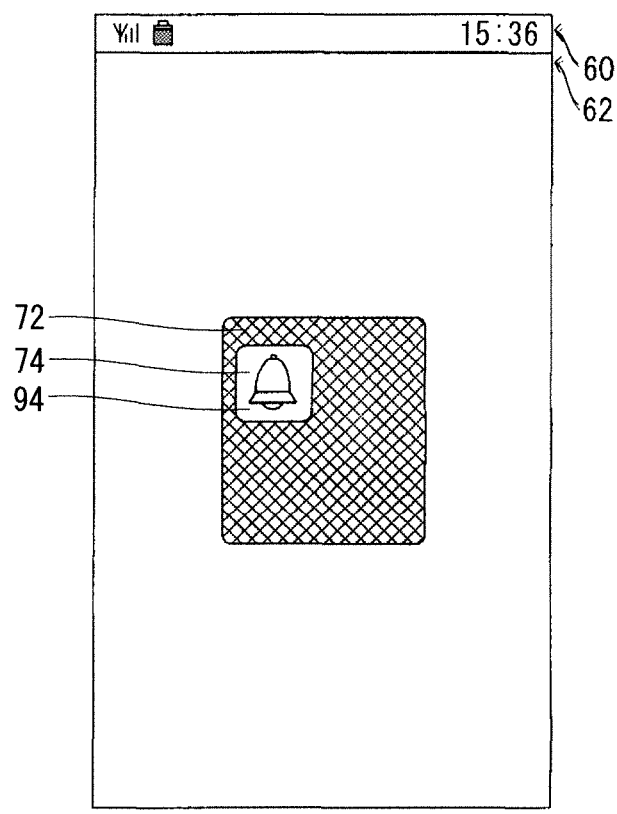

F I G. 3 5
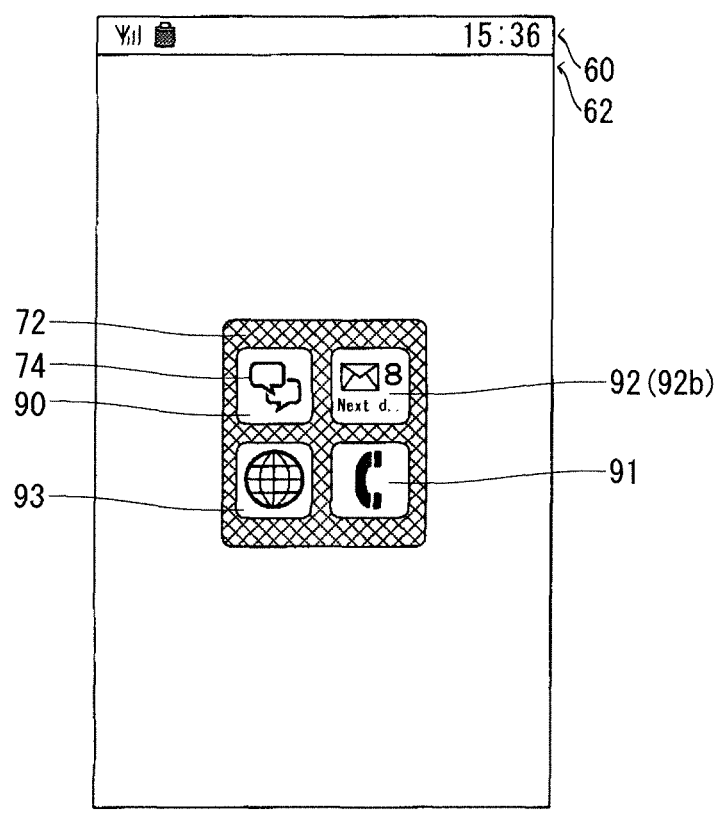

F I G . 4 6
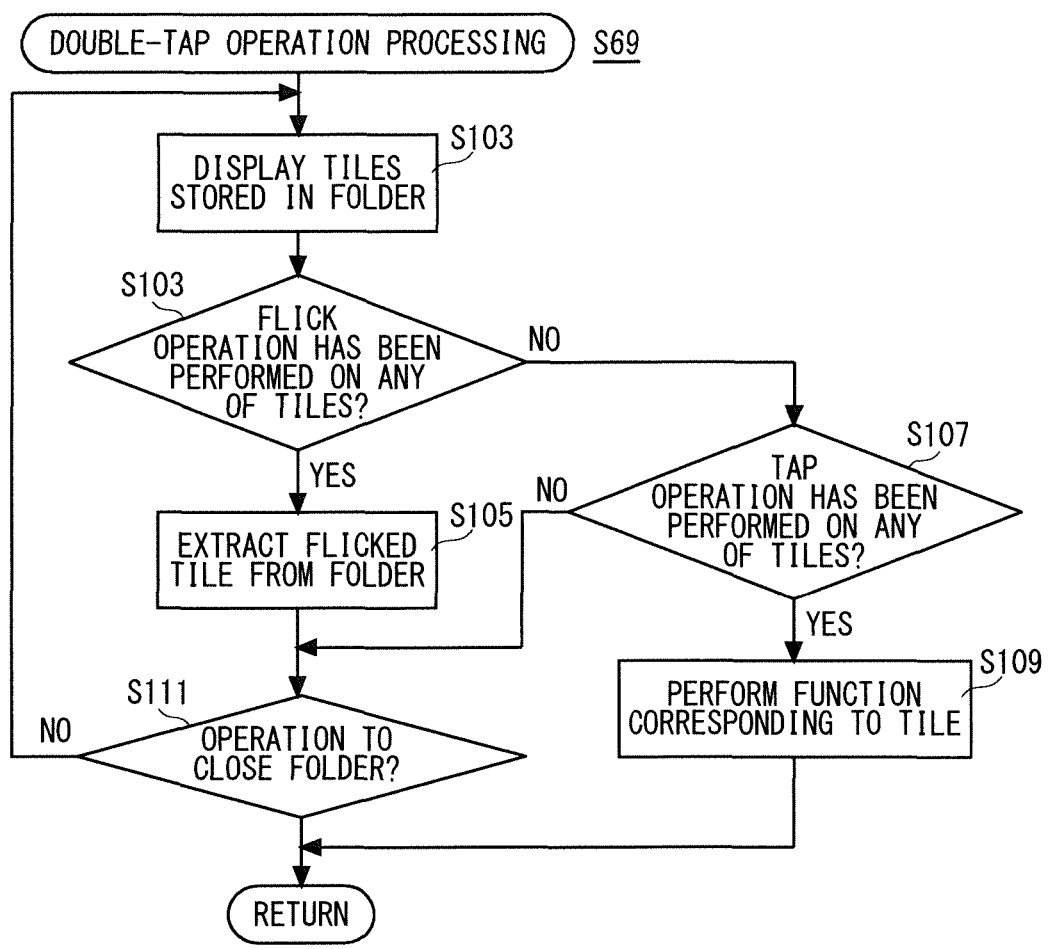

MOBILE TERMINAL, MEMORY, AND FOLDER CONTROL METHOD

CROSS-REFERENCE TO RELATED APPLICATIONS

The present application is a continuation of International Application No. PCT/JP2014/069969, filed on Jul. 29, 2014, which claims the benefit of Japanese Patent Application No. 2013-156693, filed on Jul. 29, 2013. International Application No. PCT/JP2014/069969 is entitled "PORTABLE TERMINAL, MEMORY, AND FOLDER CONTROL METHOD", and Japanese Patent Application No. 2013-156693 is entitled "PORTABLE TERMINAL, FOLDER CONTROL PROGRAM, AND FOLDER CONTROL METHOD." The contents of these applications are incorporated herein by reference in their entirety.

FIELD

Embodiments of the present disclosure relate to a mobile terminal using a folder.

BACKGROUND

In some mobile terminals, when one object is dragged and dropped so as to overlap at least part of one icon, a new folder is created, and the object and a file associated with the icon are stored in the new folder. In other specific examples, when an object is dragged and dropped so as to overlap any of two icons overlapping each other, a new folder is created, and files associated with the two icons are stored in the new folder.

SUMMARY

A mobile terminal, memory, and a folder control method are disclosed. In one embodiment, a mobile terminal includes a display unit, a touch panel, and at least one processor. The display unit is a device on which a tiled object corresponding to a function is displayed. The touch panel is located on the display unit. The at least one processor displays, when a plurality of tiled objects are stored in a folder, the folder on the display unit. The at least one processor displays an image representing a tiled object stored in the folder on the display unit in association with the folder. The at least one processor performs, when a touch operation is performed on the folder, a function corresponding to the tiled object represented by the image displayed on the display unit.

In one embodiment, memory stores a program so that the program is readable. The program causes a mobile terminal to perform a first display control step, a second display control step, and a performance step. The mobile terminal includes a display unit on which a tiled object corresponding to a function is displayed and a touch panel located on the display unit. The first display control step is a step of displaying, when a plurality of tiled objects are stored in a folder, the folder on the display unit. The second display control step is a step of displaying an image representing a tiled object stored in the folder on the display unit in association with the folder. The performance step is a step of performing, when a touch operation is performed on the folder, a function corresponding to the tiled object represented by the image displayed on the display unit through control of the second display control step.

In one embodiment, a folder control method is a method for use in a mobile terminal. The mobile terminal includes a display unit on which a tiled object corresponding to a function is displayed and a touch panel located on the display unit. A processor of the mobile terminal performs a first display control step, a second display control step, and a performance step. The first display control step is a step of displaying, when a plurality of tiled objects are stored in a folder, the folder on the display unit. The second display control step is a step of displaying an image representing a tiled object stored in the folder on the display unit in association with the folder. The performance step is a step of performing, when a touch operation is performed on the folder, a function corresponding to the tiled object represented by the image displayed on the display unit through the second display control step.

In one embodiment, a mobile terminal includes a display unit, a touch panel, and at least one processor. The touch panel is located on the display unit. The at least one processor displays a tiled object corresponding to a function on the display unit. The at least one processor selects, when two positions are touched, a tiled object included in a rectangle defined by the two positions. The at least one processor creates a folder when the two positions are moved towards each other. The at least one processor stores the selected tiled object selected in the folder.

BRIEF DESCRIPTION OF DRAWINGS

FIG. 1 illustrates the appearance of a mobile phone according to one embodiment.

FIG. 2 illustrates electrical configuration of the mobile phone according to one embodiment.

FIG. 4 illustrates an example of displaying a home screen on a display.

FIG. 9 illustrates an example of moving touch positions.

FIG. 11 illustrates an example of selecting a folder and a tile.

FIG. 14 illustrates an example of configuration of a folder table stored in RAM.

FIG. 15 illustrates an example of a touch operation performed on a folder.

FIG. 16 illustrates an example of a screen of a function performed through the touch operation.

FIG. 17 illustrates another example of a touch operation performed on a folder.

FIG. 30 illustrates an example of a display set displayed after a display set illustrated in FIG. 27.

FIG. 34 illustrates an example of a display set displayed after the display set illustrated in FIG. 33.

FIG. 35 illustrates an example of a display set including a thumbnail image showing live information different from live information illustrated in FIG. 33.

FIG. 46 illustrates a flow chart showing an example of double-tap operation processing.

DETAILED DESCRIPTION

Figure 3:
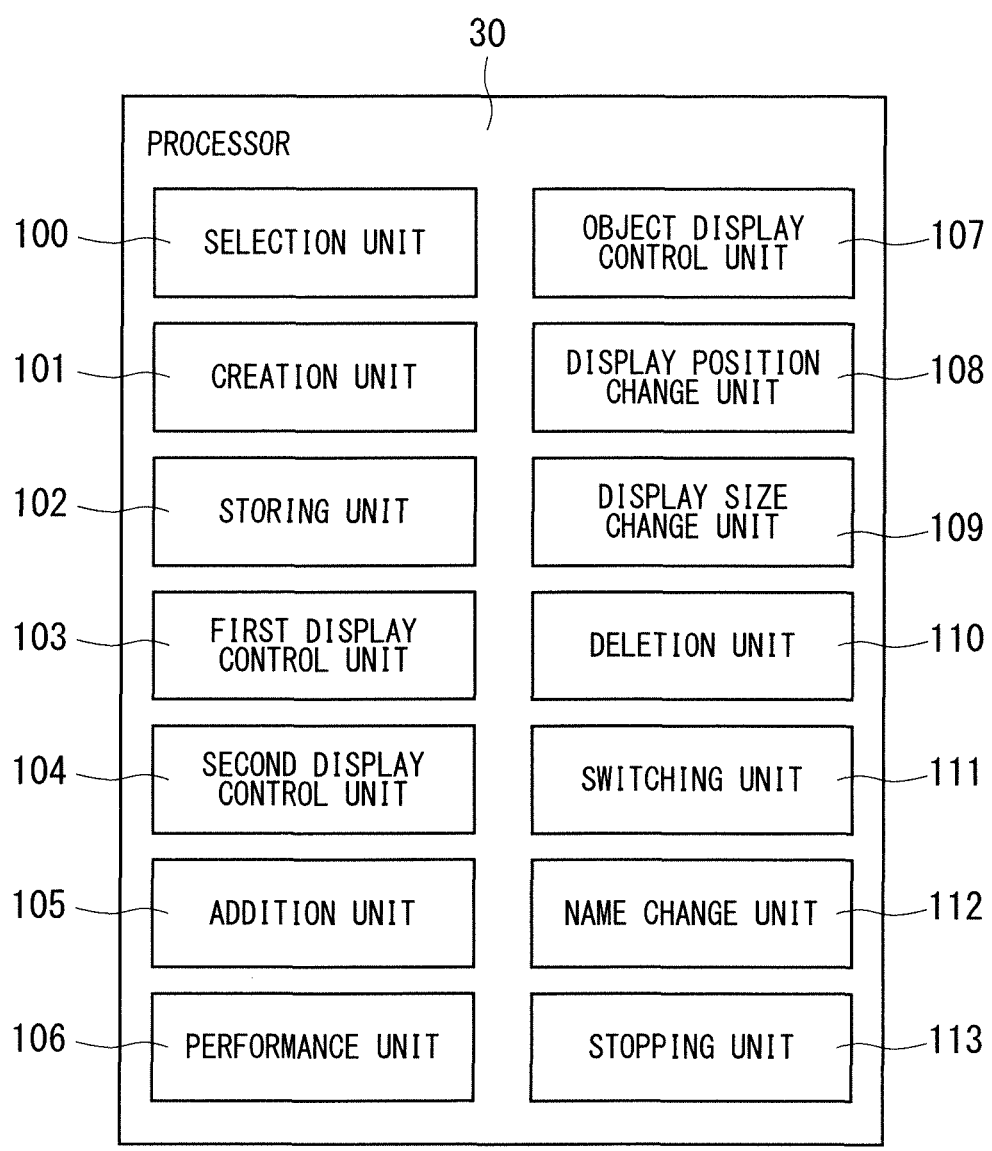
FIG. 3 illustrates functional configuration formed by a processor according to one embodiment.

As illustrated in FIG. 1, a mobile terminal according to one embodiment is, for example, a mobile phone 10 such as a smartphone. The mobile phone 10 includes a flat longitudinal rectangular housing 12. The mobile terminal, however, is not limited to the mobile phone 10 as illustrated in FIG. 1, and may be a tablet terminal, a tablet PC, a note PC, and a PDA each having a touch panel.

A display 14, such as a liquid crystal panel and an organic EL panel, is located at a main surface (front surface) of the housing 12. The display 14 is also referred to as a display unit. A touch panel 16 is located on the display 14.

A speaker 18 is embedded in the housing 12 on side of the main surface at one end in a longitudinal direction of the housing 12, and a microphone 20 is embedded in the housing 12 on side of the main surface at another end in the longitudinal direction.

A plurality of hard keys 22, which constitute an input operation means along with the touch panel 16, are provided at the main surface of the housing 12. In one embodiment, the hard keys 22 include a call key 22a, an end key 22b, and a menu key 22c.

For example, a user can input phone numbers by performing a touch operation through the touch panel 16 on a dialpad displayed on the display 14, and can start voice calls by operating the call key 22a. The user can end voice calls by operating the end key 22b. The user can power on and off the mobile phone 10 by long-pressing the end key 22b.

When the user operates the menu key 22c, a home screen is displayed on the display 14. By performing a touch operation through the touch panel 16 on an object and the like displayed on the display 14 in this state, the user can select the object, and determine the selection.

The mobile phone 10 can perform not only a phone function but also an email function, a browser function, and the like. In the following description, a GUI such as a key, an icon, and the like displayed on the display 14 are collectively referred to as objects.

As illustrated in FIG. 2, the mobile phone 10 according to one embodiment includes a processor 30 referred to as a computer or a CPU. A wireless communication circuit 32, an A/D converter 36, a D/A converter 38, an input unit 40, a display driver 42, flash memory 44, RAM 46, a touch panel control circuit 48, an attitude sensor 50, and the like are connected to the processor 30.

The processor 30 can control the mobile phone 10 as a whole. All or some programs preset in the flash memory 44 are developed on the RAM 46 in use. The processor 30 operates in accordance with the programs on the RAM 46 to achieve a plurality of functional blocks relating to the mobile phone 10. More specifically, as illustrated in FIG. 3, the programs on the RAM 46 are run in the processor 30 to form a selection unit 100, a creation unit 101, a storing unit 102, a first display control unit 103, a second display control unit 104, an addition unit 105, a performance unit 106, an object display control unit 107, a display position change unit 108, a display size change unit 109, a deletion unit 110, a switching unit 111, a name change unit 112, and a stopping unit 113. Each of the functional blocks is described in an embodiment described below. The RAM 46 is also used as a working area or a buffer area of the processor 30.

Referring back to FIG. 2, the input unit 40 includes the hard keys 22 illustrated in FIG. 1. The input unit 40 forms an operation reception unit that can receive key operations on the hard keys 22 from the user. Information (key data) on the hard keys operated by the user is input through the input unit 40 to the processor 30.

The wireless communication circuit 32 is a circuit for transmitting and receiving radio waves for voice calls and emails through an antenna 34. In one embodiment, the wireless communication circuit 32 is a circuit for performing wireless communication in accordance with a CDMA system. For example, if the user provides directions to make a call (transmit voice) by operating the touch panel 16, the wireless communication circuit 32 can perform voice transmission processing and output a voice transmission signal through the antenna 34 under the directions of the processor 30. The voice transmission signal is transmitted to a phone of a recipient through a base station and a communication network. When voice reception processing is performed in the phone of the recipient, a communicable state is established, and the processor 30 can perform call processing.

The microphone 20 illustrated in FIG. 1 is connected to the A/D converter 36, and the A/D converter 36 can convert voice signals from the microphone 20 into digital voice data, and input the digital voice data into the processor 30 as described above. On the other hand, the speaker 18 is connected to the D/A converter 38. The D/A converter 38 can covert digital voice data into voice signals, and provide the voice signals to the speaker 18 through an amplifier. Voice based on the voice data is thus output from the speaker 18. When the call processing is being performed, voice collected by the microphone 20 is transmitted to the phone of the recipient, and voice collected by the phone of the recipient is output from the speaker 18.

The processor 30 can adjust the volume of voice output from the speaker 18 by controlling an amplification factor of the amplifier connected to the D/A converter 38 in response to a volume adjustment operation performed by the user, for example.

The display 14 illustrated in FIG. 1 is connected to the display driver 42. Videos or images are displayed on the display 14 in accordance with video data or image data output from the processor 30. The display driver 42 includes video memory for temporarily storing image data to be displayed on the display 14. Data output from the processor 30 is stored in the video memory. The display driver 42 can display images on the display 14 in accordance with the contents of the video memory. This means that the display driver 42 can control display on the display 14 connected to the display driver 42 under the directions of the processor 30. The processor 30 is thus also referred to as a display control unit. A backlight is provided on the display 14. The display driver 42 can control display brightness and turning-on and -off of the backlight in accordance with the directions of the processor 30.

The touch panel 16 illustrated in FIG. 1 is connected to the touch panel control circuit 48. The touch panel control circuit 48 can provide necessary voltage and the like to the touch panel 16. The touch panel control circuit 48 can also input, into the processor 30, a touch start signal indicating the start of a touch of the user on the touch panel 16, an end signal indicating the end of the touch of the user, and coordinate data indicating a touch position of the touch of the user. The processor 30 can thus determine an object touched by the user based on the coordinate data.

In one embodiment, the touch panel 16 is a capacitive touch panel that can detect a change in capacitance caused between the surface of the touch panel 16 and a thing such as a finger. The touch panel 16 can detect a touch of one or more fingers on the touch panel 16, for example. The touch panel 16 is thus also referred to as a pointing device. The touch panel control circuit 48 can detect a touch operation in a touch detectable range of the touch panel 16, and output coordinate data indicating the position of the touch operation to the processor 30. This means that the user performs a touch operation on the surface of the touch panel 16 to input the position, the direction, and the like of the operation into the mobile phone 10.

The mobile phone 10 may include a non-transitory recording medium readable by the processor 30 in addition to the RAM 46 and the flash memory 44. The mobile phone 10 may include a hard disk drive, a solid state drive (SSD), universal serial bus (USB) memory, and the like, for example.

In one embodiment, the touch operation includes a tap operation, a long-tap operation, a flick operation, a slide operation, and the like.

The tap operation refers to an operation to touch the surface of the touch panel 16 with a finger and then release the finger from the surface of the touch panel 16 in a short time. The long-tap operation refers to an operation to touch the surface of the touch panel 16 with a finger for a predetermined time or more and then release the finger from the surface of the touch panel 16. The flick operation refers to an operation to touch the surface of the touch panel 16 with a finger and flick the surface of the touch panel 16 with the finger in any direction at a predetermined speed or more. The slide operation refers to an operation to move a finger on the surface of the touch panel 16 in any direction with the finger being in contact with the surface of the touch panel 16 and then release the finger from the surface of the touch panel 16.

The above-mentioned slide operation includes a slide operation to touch a display object displayed on the surface of the display 14 with a finger and move the display object, a so-called drag operation. An operation to release the finger from the surface of the touch panel 16 after the drag operation is referred to as a drop operation.

In the following description, the tap operation, the long-tap operation, the flick operation, the slide operation, the drag operation, and the drop operation may each be described by omitting a term "operation". The touch operation may be performed not only with a finger of the user but also with a stylus pen or the like.

The attitude sensor 50 is used to detect movement of the mobile phone 10. The attitude sensor 50 is a piezoelectric gyro, for example. The attitude sensor 50 can detect angular velocities of three axes (x-, y-, and z-axes), and output results of detection to the processor 30. The processor 30 can detect movement and a tilt of the mobile phone 10 based on the angular velocities of the respective axes detected by the attitude sensor 50. The processor 30 can control a display direction of the display 14 and the like based on the detected movement. As the attitude sensor 50, an acceleration sensor may be used in place of the gyro sensor.

FIG. 4 illustrates an example of the home screen displayed on the display 14. A display range of the display 14 includes a state display area 60 and a function display area 62. In the state display area 60, a picto indicating a radio wave reception state of the antenna 34, a picto indicating the amount of power remaining in a secondary battery, and time are displayed. In the function display area 62, a home screen including tiled objects 70 (hereinafter, simply referred to as tiles 70) corresponding to respective functions is displayed.

The tiles 70 function as shortcuts for the respective functions. The user can cause the mobile phone 10 to perform the functions corresponding to the tiles 70 by tapping the tiles 70. In a case where the functions corresponding to the tiles 70 are performed in the background, states of the functions are shown as live information by the tiles 70. The user can further cause the mobile phone 10 to add a tile 70 corresponding to any function to the home screen. The "functions" in one embodiment include an application installed in the mobile phone 10 as well as a setting function to change settings of the mobile phone 10.

In the home screen of FIG. 4, a social networking service (an SNS) tile 80 corresponding to an application of an SNS such as Twitter® and Facebook®, a phone tile 81 corresponding to a phone function, an email tile 82 corresponding to an email function, a browser tile 83 corresponding to a browser function, and an alarm tile 84 corresponding to an alarm function are displayed. The home screen can be scrolled vertically. The user can display other tiles 70 on the display 14 by scrolling the home screen.

When a tile 70 is long-tapped, a display state of the tile 70 becomes editable in the mobile phone 10. In this state, a display size and a display position of the tile 70 can be changed, and the tile 70 can be deleted. Even if the tile 70 is deleted, a corresponding application is not uninstalled.

In the email tile 82, the number ("8") of incoming emails and a subject (Meeting) of an incoming email received in the background in the email function are displayed as the live information. The live information is updated at predetermined time (e.g., two to three seconds) intervals. For example, in a case where an incoming email is received in the email function, the number of incoming emails and a subject of an incoming email are updated as the live information of the email tile 82. As described above, the latest information acquired in a function corresponding to a tile 70 is displayed in the tile 70 as the live information. In a case where no incoming email is received in the email function, the live information of the email tile 82 is updated so that the number of incoming emails is not changed, but a subject of another incoming email is displayed. By checking the live information displayed in the tile 70, the user can determine whether the function corresponding to the tile 70 is required to be performed by the mobile phone 10.

The email function is performed when the user taps the email tile 82. In this case, the email function is performed based on the live information. In a case where a subject of an incoming email is shown as the live information, for example, the email function is performed so that text and the like of the incoming email corresponding to the subject of the incoming email are displayed on the display 14.

In a case where many tiles 70 are added to the home screen, it takes the user a long time to search for a target tile 70 to perform a function. In one embodiment, tiles 70 are stored in a folder so that functions corresponding to the stored tiles 70 are easily performed.

Figure 5:
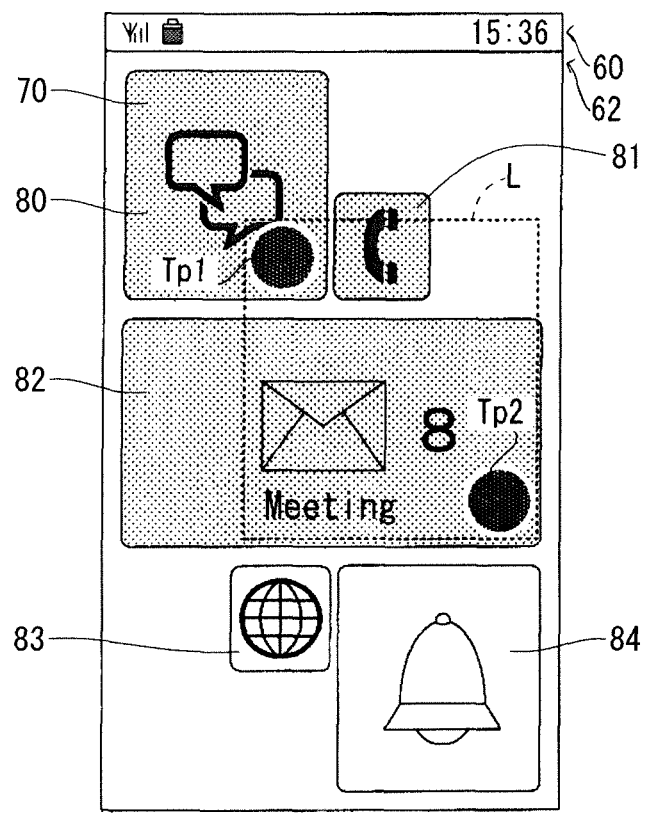
FIG. 5 illustrates an example of an operation to select tiles.

An example of the procedure for creating a folder with the home screen being displayed on the display 14 is described with reference FIGS. 5 to 7. As illustrated in FIG. 5, when a touch operation (multi-touch operation) is performed substantially simultaneously at two positions, namely a first touch position Tp1 on the SNS tile 80 and a second touch position Tp2 on the email tile 82, a rectangle is defined based on the touch positions. The defined rectangle is indicated in a selection line L, and the selection unit 100 can select three tiles 70, namely the SNS tile 80, the phone tile 81, and the email tile 82, included in the selection line L. This means that, when the user performs the multi-touch operation, the selection unit 100 can select tiles 70 included in the selection line L defined through the multi-touch operation.

Figure 6:
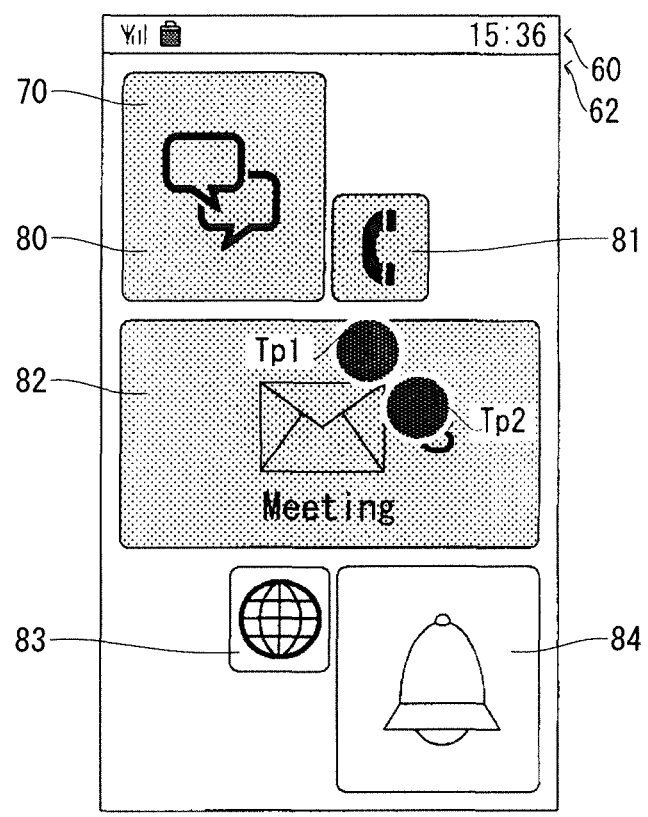
FIG. 6 illustrates an example of moving touch positions.

Next, as illustrated in FIG. 6, when the user moves each of the first touch position Tp1 and the second touch position Tp2 by a predetermined distance or more so that the first touch position Tp1 and the second touch position Tp2 are moved towards each other, display of the tiles 70 selected by the selection unit 100 is removed. The creation unit 101 can then create a folder based on the number of tiles 70 selected by the selection unit 100. The storing unit 102 can store the selected tiles 70 in the folder created by the creation unit 101. As illustrated in FIG. 7, the first display control unit 103 can display the folder 72 in which the tiles 70 are stored on the display 14 based on the center of gravity of the defined rectangle. The first display control unit 103 can display the folder 72 created by the creation unit 101 on the display 14 in a different manner from the tiles 70. The second display control unit 104 can display thumbnail images 74 of the tiles 70 stored in the folder 72 in a display range of the folder 72. In the example illustrated in FIG. 7, a thumbnail image 90 (74) of the SNS tile 80, a thumbnail image 91 (74) of the phone tile 81, and a thumbnail image 92 (74) of the email tile 82 are displayed in the display range of the folder 72.

In the following description, an operation to move the two touch positions towards each other after the multi-touch operation is referred to as a "pinch-in operation".

In other embodiments, the creation unit 101 may create the folder 72 when the user performs the multi-touch operation. Although the tiles 70 are selected as long as parts of the tiles 70 are included in the defined rectangle in one embodiment, the selection unit 100 may not select a tile unless the tile as a whole is included in the defined rectangle in yet other embodiments.

Figure 10:
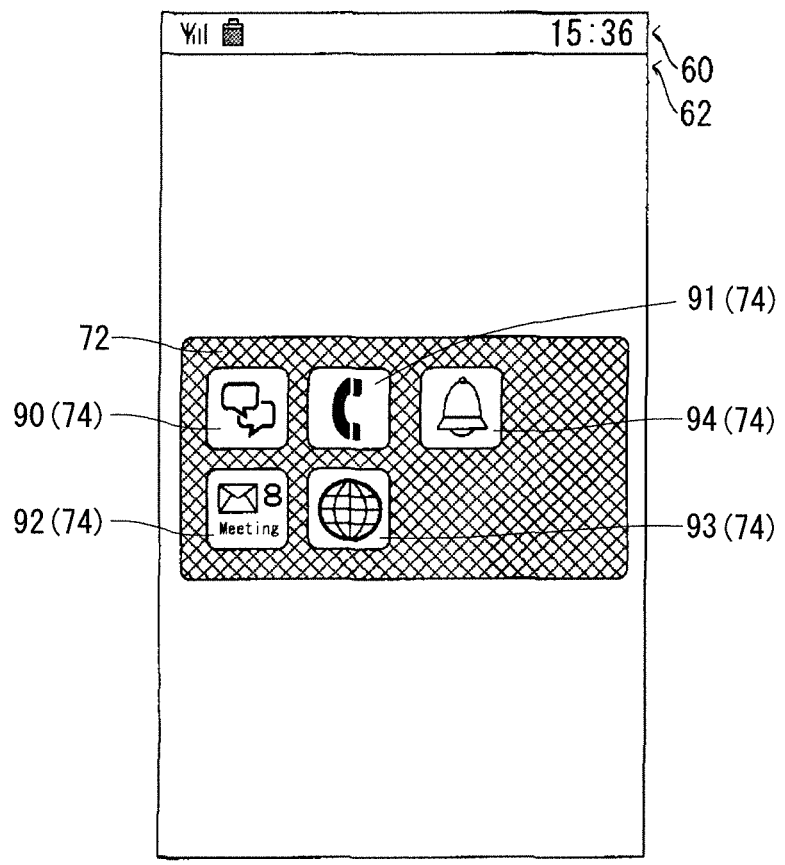
FIG. 10 illustrates an example of creating a folder.

A case where the display size of the folder 72 varies depending on the number of tiles 70 selected by the selection unit 100 is described with reference to FIGS. 8 to 10. When the pinch-in operation is performed so that the selection unit 100 can select five tiles 70 as illustrated in FIGS. 8 and 9, for example, the folder 72 is created as illustrated in FIG. 10, and the five tiles 70 are stored in the folder 72. In the example illustrated in FIG. 10, the thumbnail image 90 (74) of the SNS tile 80, the thumbnail image 91 (74) of the phone tile 81, the thumbnail image 92 (74) of the email tile 82, a thumbnail image 93 (74) of the browser tile 83, and a thumbnail image 94 (74) of the alarm tile 84 are displayed in the display range of the folder 72. In this case, the thumbnail images 74 of the five tiles 70 cannot be displayed at one time when the folder 72 has the display size illustrated in FIG. 7. Thus, in a case where the number of stored tiles 70 is five or more, the folder 72 having the display size illustrated in FIG. 10 is displayed on the display 14.

Figure 7:
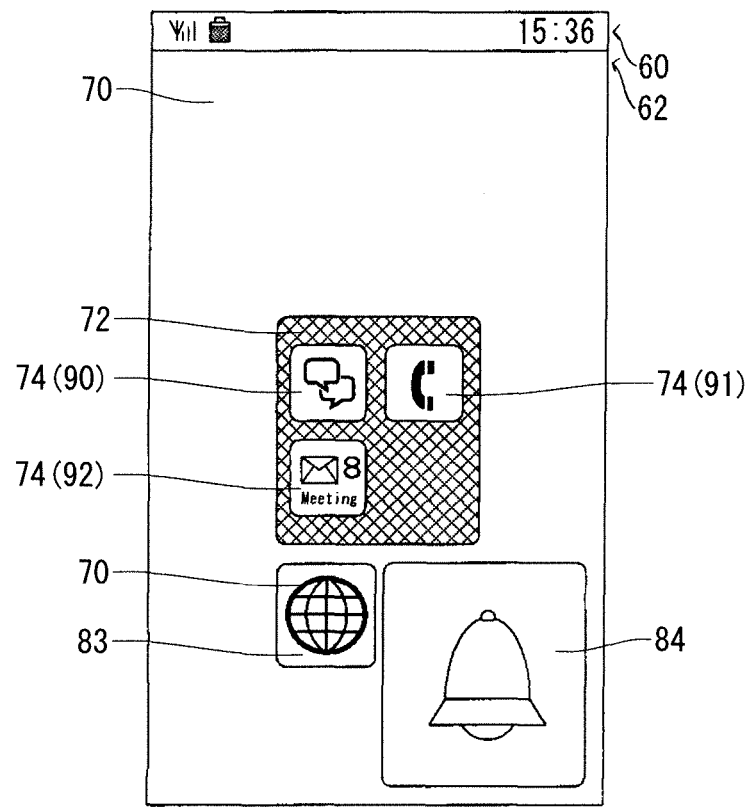
FIG. 7 illustrates an example of creating a folder.
Figure 8:
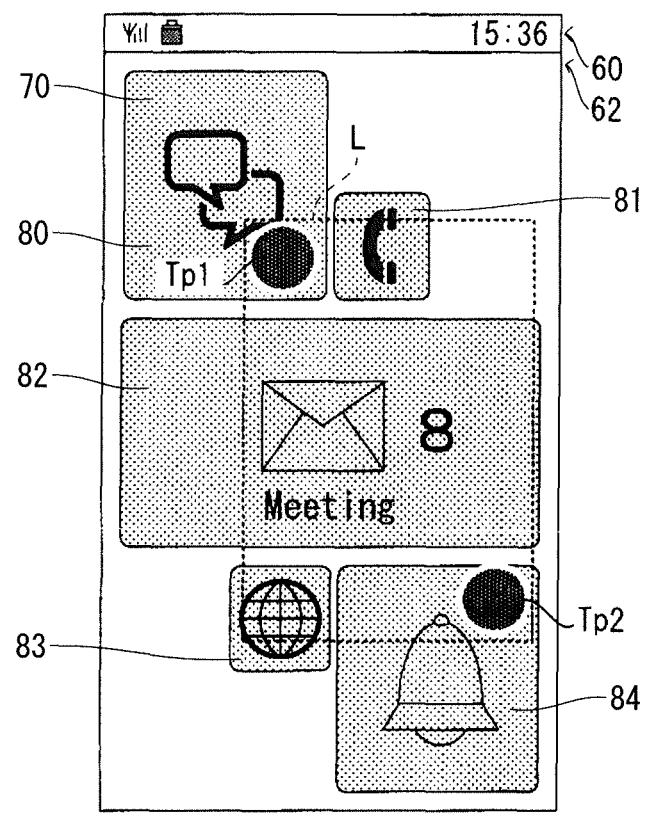
FIG. 8 illustrates an example of an operation to select tiles.

In one embodiment, the display size of the folder 72 illustrated in FIG. 10 is a large size, and the display size of the folder 72 illustrated in FIG. 7 is a medium size. When the number of tiles 70 stored in the folder 72 is two to four, the folder 72 having the medium size is displayed on the display 14. When the number of tiles 70 stored in the folder 72 is five to eight, the folder 72 having the large size is displayed on the display 14. Up to eight thumbnail images 74 can be displayed in the folder 72 having the large size, and up to four thumbnail images 74 can be displayed in the folder 72 having the medium size. The display size of the folder 72 can be changed, which is described in detail below. A folder 72 having a small size at which a single thumbnail image 74 can be displayed may be displayed on the display 14.

As described above, the user can cause the mobile phone 10 to select a plurality of tiles 70 together, and to store the tiles 70 in the folder 72 together. This allows the user to easily organize the tiles 70 displayed in the home screen.

In one embodiment, the maximum number of tiles 70 that can be stored in the folder 72 is set to match the number ("eight") of thumbnail images 74 that can be displayed in the folder 72 having the large size. In other embodiments, however, the number of tiles 70 that can be stored in the folder 72 may be larger than the number of thumbnail images 74 that can be displayed in the folder 72 having the large size, or may not be limited. When the pinch-in operation is performed on a single tile 70, the folder 72 having the small size is created.

Figure 12:
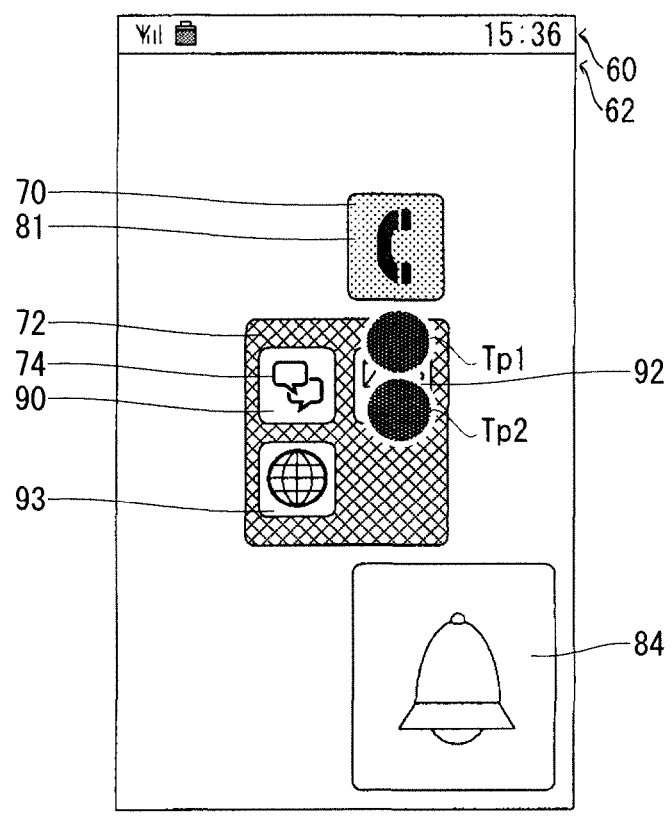
FIG. 12 illustrates an example of moving touch positions.
Figure 13:
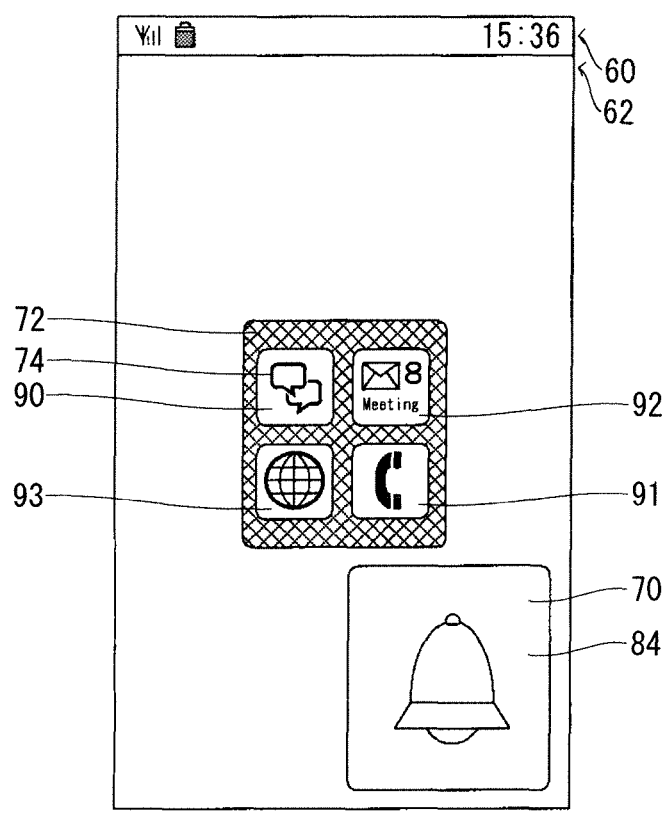
FIG. 13 illustrates an example of adding a tile to a folder.

A case where a tile 70 is added to a folder 72 is described with reference to FIGS. 11 to 13. In one embodiment, when the user selects a tile 70 added to a folder 72 and the folder 72 and performs the pinch-in operation, the addition unit 105 can add the tile 70 to the folder 72. For example, if the pinch-in operation is performed on the phone tile 81 and the folder 72 as illustrated in FIGS. 11 and 12, the addition unit 105 can add the thumbnail image 91 of the phone tile 81 to the folder 72 as illustrated in FIG. 13. As described above, the user can cause the mobile phone 10 to add any tile 70 to the folder 72.

Although a single tile 70 is added in one embodiment described above, two or more tiles 70 may be added to the folder 72 through the pinch-in operation. In other embodiments, a new folder 72 for storing the folder 72 and the tile 70 on which the pinch-in operation is performed may be created.

FIG. 14 illustrates an example of a folder table in which folder information is stored. The folder table includes columns of a folder ID, a name, a display size, a display position, the number of tiles, functions, thumbnail images, and switching. Folder information of a single folder 72 is stored in a row corresponding to a folder ID. An ID for distinguishing among a plurality of folders 72 is stored in the column of the folder ID. A name of the folder 72 is stored in the column of the name. Any one of the above-mentioned "large size", "medium size", and "small size" is stored in the column of the display size. A display range (display coordinates) of the folder 72 is stored in the column of the display position. Information on the display position is used to determine whether a touch operation is a touch operation performed on the folder 72. The number of tiles 70 stored in the folder 72 is stored in the column of the number of tiles. The column of the thumbnail images is further divided into columns including a column of a first thumbnail image. A tile 70 corresponding to a thumbnail image 74 displayed in the display range of the folder 72 and a display range (display coordinates) of the thumbnail image 74 are stored in each of these columns. Information indicating whether switching of the thumbnail image 74, which is described below, is possible or not is stored in the column of switching. The touch operation performed on the folder 72 is determined based on the folder table.

For example, in folder information of a folder 72 having a folder ID "0001", the name is "main", the display size is the "medium size", the display position is "(X1, Y1)–(X2, Y2)", the number of stored tiles 70 is "4", functions corresponding to the tiles 70 are "SNS", "email", and so on, the thumbnail images 74 displayed in the display range of the folder 72 includes a first thumbnail image "SNS/(x1, y1)–(x2, y2)", and switching is set to be not possible ("×").

The tap operation performed on the folder 72 is described with reference to FIGS. 15 and 16. In one embodiment, when the tap operation is performed on the folder 72, and the touch position of the tap operation is included in a display range of a thumbnail image 74 displayed in the display range of the folder 72, an application is run based on a tile 70 corresponding to the thumbnail image 74. For example, if a tap operation Tt is performed on the thumbnail image 92 (74) of the email tile 82 as illustrated in FIG. 15, the performance unit 106 can perform the email function as illustrated in FIG. 16. In this case, the thumbnail image 92 of the email tile 82 shows live information as with the email tile 82. Thus, when the performance unit 106 performs the email function, an incoming email is displayed on the display 14 based on the live information displayed in the thumbnail image 92 of the email tile 82.

As described above, the user can easily cause the mobile phone 10 to perform the function corresponding to the tile 70 stored in the folder 72. By checking the live information, the user can also determine whether the function is required to be performed.

Figure 18:
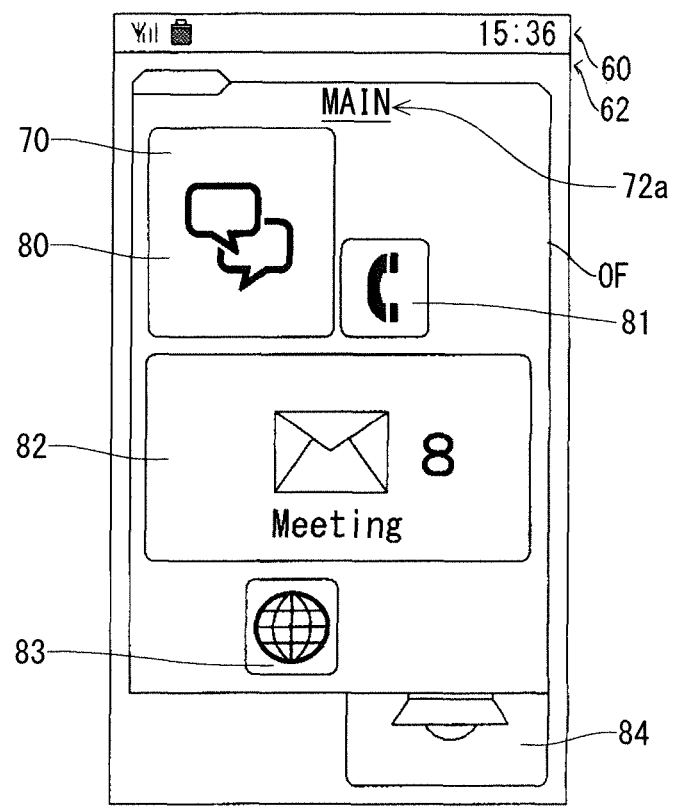
FIG. 18 illustrates an example of displaying tiles stored in a folder.

The double-tap operation performed on the folder 72 is described with reference to FIGS. 17 and 18. When the double-tap operation is performed on the folder 72, the folder 72 is opened, and the tiles 70 stored in the folder 72 are displayed on the display 14. For example, if a double-tap operation Td is performed on the folder 72 as illustrated in FIG. 17, the object display control unit 107 can display an expanded folder image OF on the display 14 as illustrated in FIG. 18. In the expanded folder image OF, the object display control unit 107 displays the SNS tile 80, the phone tile 81, the email tile 82, and the browser tile 83 stored in the folder 72 as well as a name 72a of the folder. When the tap operation is performed on a tile 70 displayed in the expanded folder image OF, a function corresponding to the tile 70 is performed. The user can thus cause the mobile phone 10 to open the folder 72 and perform the function corresponding to the tile 70.

When the tiles 70 stored in the folder 72 are displayed in the expanded folder image OF, the tiles 70 are each displayed on the display 14 in display states before the tiles 70 are stored in the folder 72. In other embodiments, the folder 72 may be opened when the user performs an operation to shake the mobile phone 10 while touching the display range of the folder 72.

Figure 19:
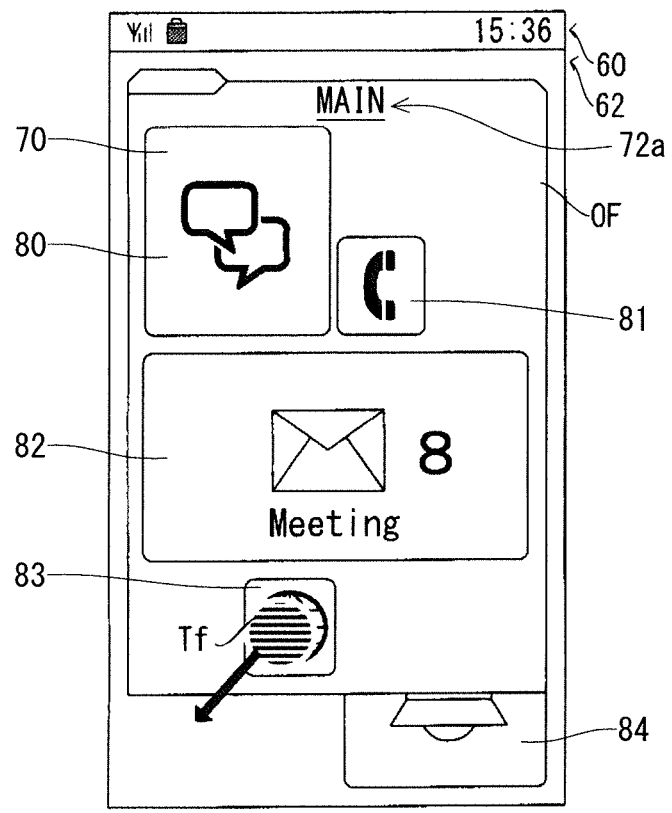
FIG. 19 illustrates an example of a touch operation performed on a tile stored in the folder.
Figure 20:
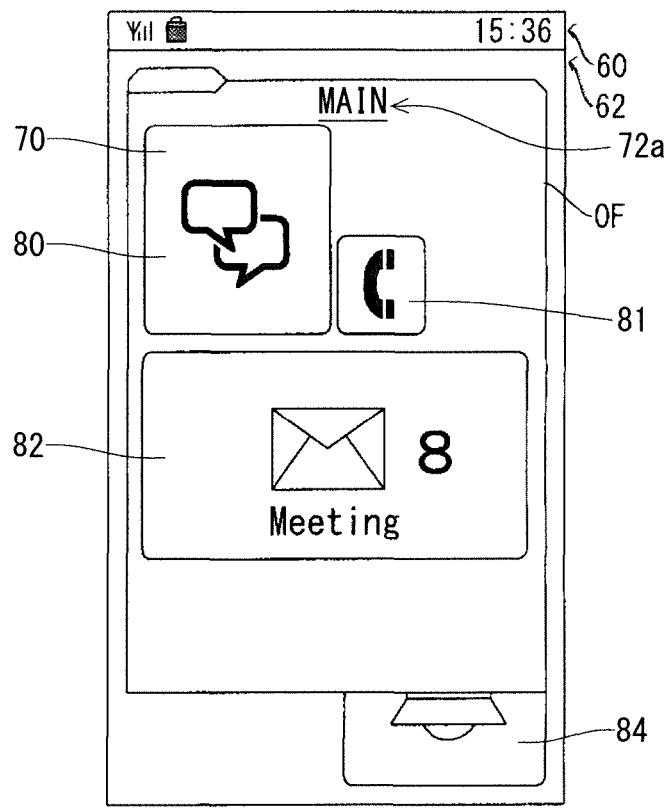
FIG. 20 illustrates an example of extracting the tile from the folder.
Figure 21:
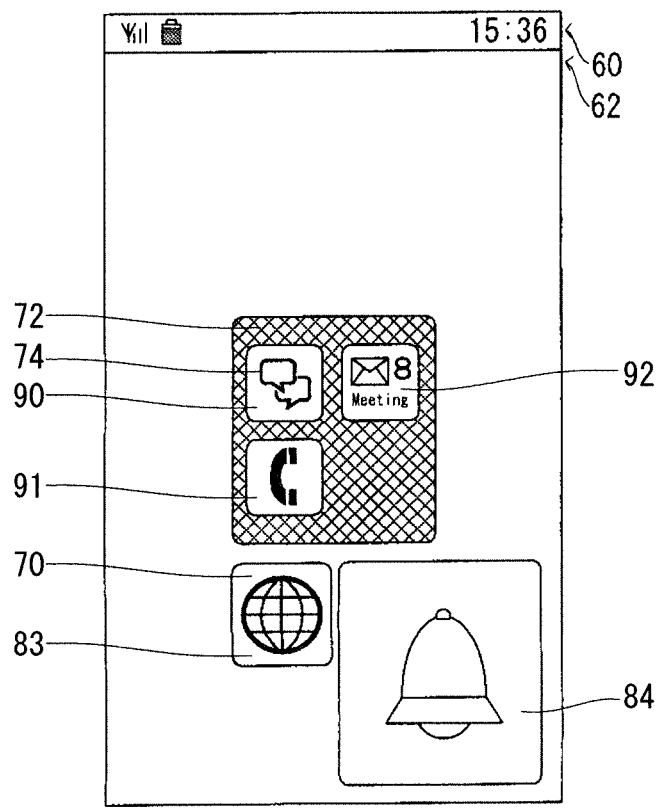
FIG. 21 illustrates an example of displaying the tile extracted from the folder.

As illustrated in FIG. 19, a tile 70 stored in the folder 72 can be extracted from the folder 72 when the folder 72 is opened. For example, in a case where the browser tile 83 is extracted from the folder 72, the user performs a flick operation Tf on the browser tile 83 towards the outside of the folder 72. As a result, as illustrated in FIG. 20, display of the browser tile 83 is removed from display of the tiles 70 stored in the folder 72. When an operation to close the folder 72 is performed, the browser tile 83 is displayed on the display 14 along with the folder 72 as illustrated in FIG. 21. The folder 72 is herein closed when the menu key 22c is pressed. As described above, the user can cause the mobile phone 10 to extract an unnecessary tile 70 from the folder 72.

The opened folder 72 is also closed when a tap operation is performed outside a display range of the expanded folder image OF.

Figure 22:
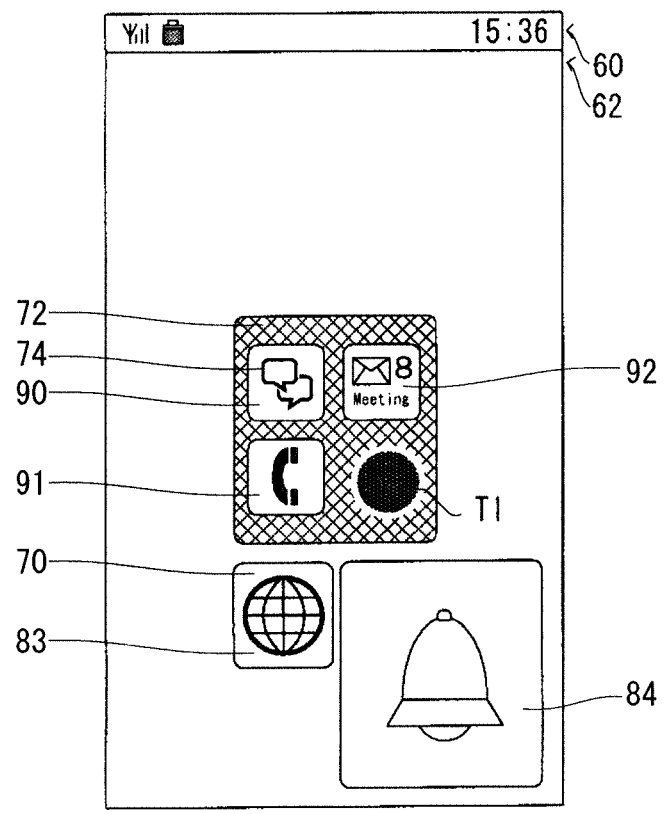
FIG. 22 illustrates an example of a touch operation performed on a folder.
Figure 23:
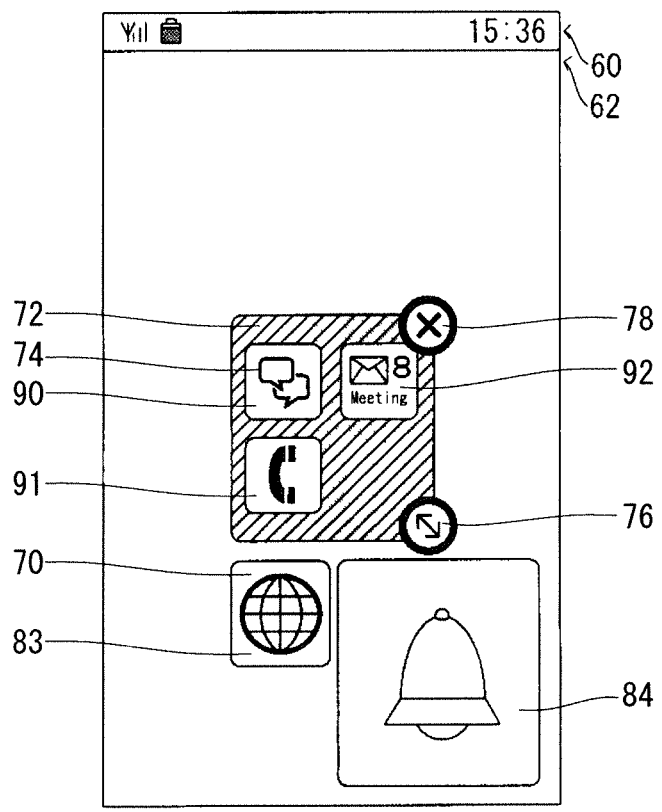
FIG. 23 illustrates an example of a folder in an editable state.

The long-tap operation performed on the folder 72 is described with reference to FIGS. 22 and 23. When a long-tap operation Tl is performed on the folder 72 as illustrated in FIG. 22, the display position and the display size of the folder 72 become editable as illustrated in FIG. 23. When the folder 72 becomes editable, a display manner (e.g., color) of the folder 72 changes, and a size change icon 76 and a deletion icon 78 are displayed as editing icons on the display 14 so as to overlap the folder 72.

Figure 24:
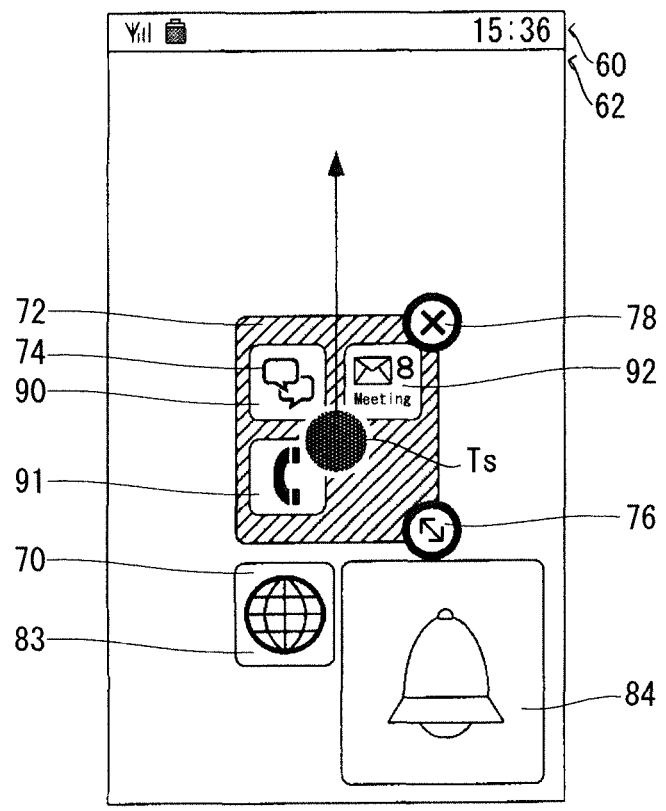
FIG. 24 illustrates an example of a touch operation performed on a folder.
Figure 25:
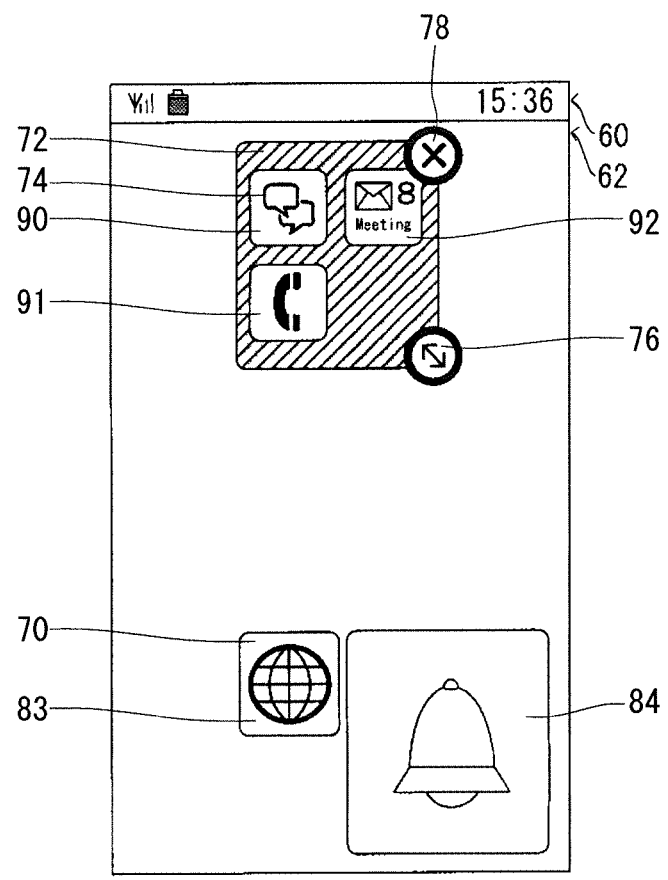
FIG. 25 illustrates an example of a result of a change in display position of a folder.

As illustrated in FIGS. 24 and 25, when a slide operation is performed after the folder 72 is touched in the above-mentioned editable state, the display position change unit 108 can change the display position of the folder 72 following the touch position. For example, when a slide operation Ts is performed upwards as illustrated in FIG. 24, the display position change unit 108 can change the display position of the folder 72 displayed on the display 14 to a position above the original display position as illustrated in FIG. 25. This means that the user can cause the mobile phone 10 to change the display position of the folder 72 to any position. Although not illustrated, the slide operation is not limited to the upward slide operation, and may be a downward slide operation, a horizontal slide operation, or a diagonal slide operation.

Figure 26:
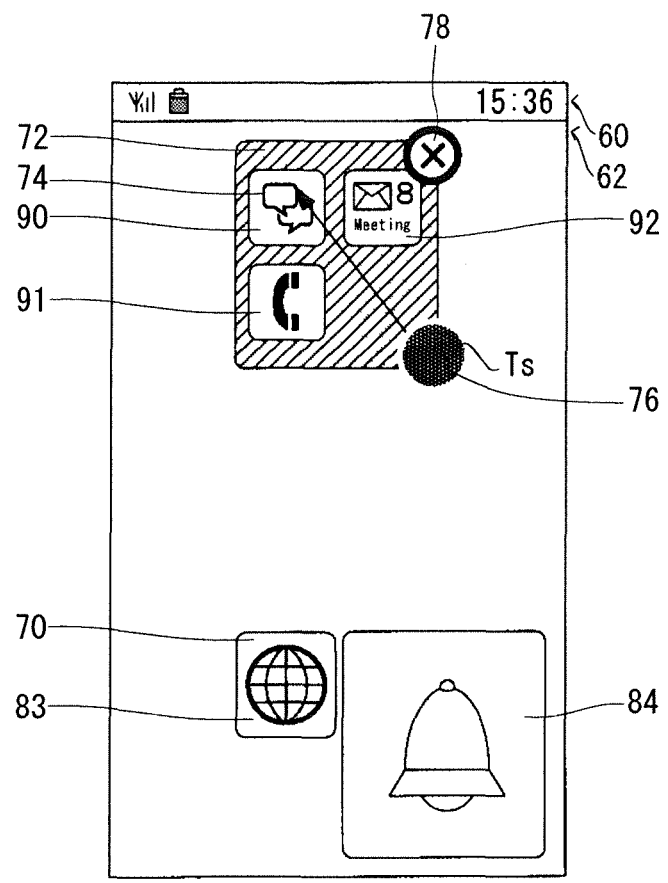
FIG. 26 illustrates another example of a touch operation performed on a folder.
Figure 27:
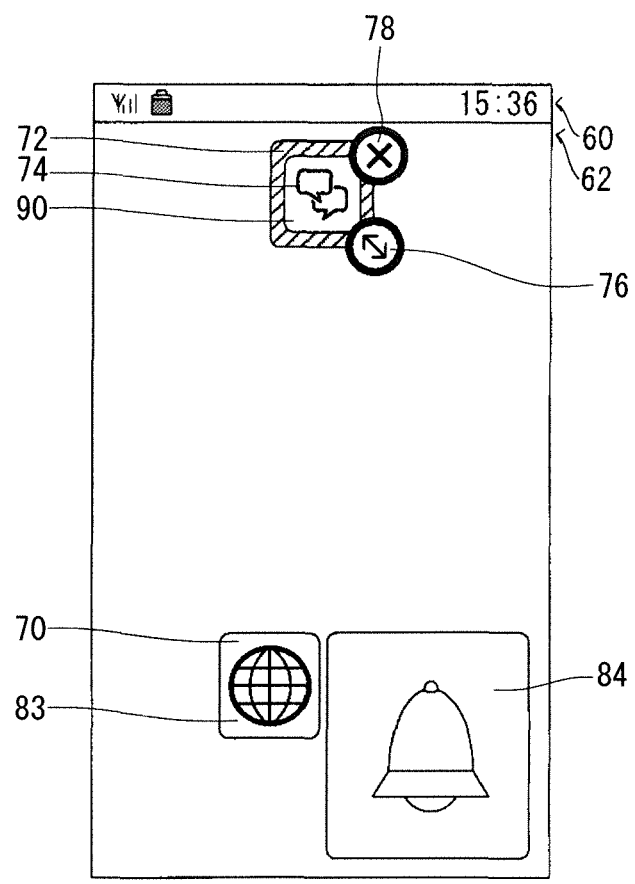
FIG. 27 illustrates an example of a result of a change in display size of a folder.

As illustrated in FIGS. 26 and 27, the user can cause the display size change unit 109 to change the display size of the folder 72 by performing the slide operation after touching the size change icon 76. For example, when the slide operation Ts is performed towards the inside of the folder 72 as illustrated in FIG. 26, the display size change unit 109 can change the display size of the folder 72 displayed on the display 14 from the medium size to the small size, and display the folder 72 having the small size on the display 14 as illustrated in FIG. 27. Although not illustrated, when the slide operation is performed towards the outside of the folder 72, the display size change unit 109 can change the display size of the folder 72 displayed on the display 14 from the medium size to the large size, and display the folder 72 having the large size on the display 14. That is to say, the slide operation performed towards the inside of the folder 72 can reduce the display size of the folder 72. The slide operation performed towards the outside of the folder 72 can increase the display size of the folder 72. However, a slide operation to further reduce the folder 72 having the small size and a slide operation to further increase the folder 72 having the large size are disabled. The user can thus cause the mobile phone 10 to change the display size of the folder 72.

The change in display position and display size of the folder 72 is determined when the menu key 22c is pressed. This means that the user can cause the mobile phone 10 to end the editable state of the folder 72 by pressing the menu key 22c.

Figure 28:
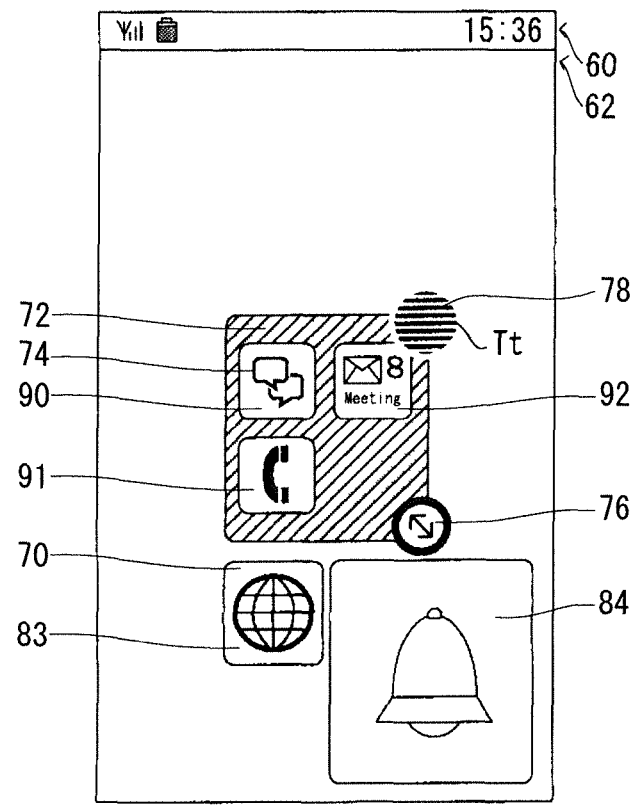
FIG. 28 illustrates another example of a touch operation performed on a folder.
Figure 29:
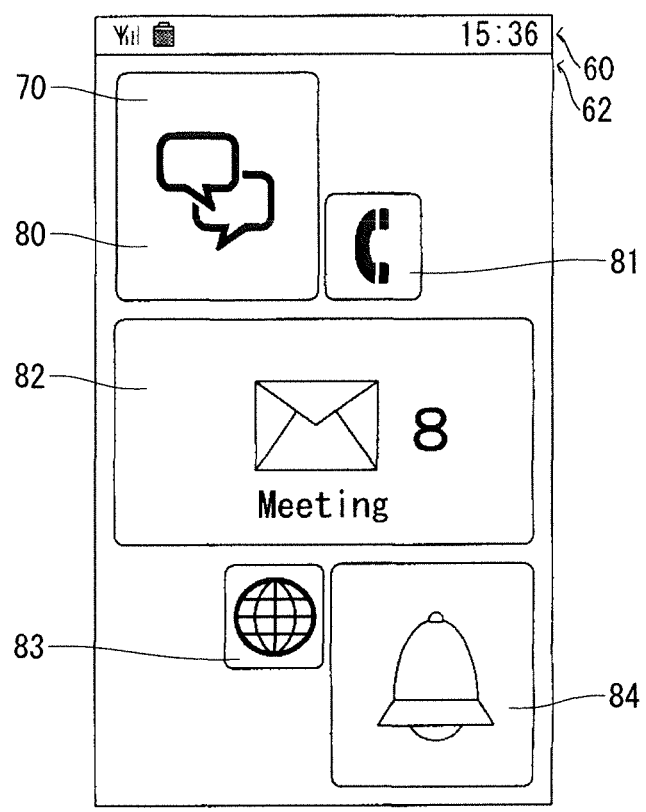
FIG. 29 illustrates an example of deleting a folder.

As illustrated in FIGS. 28 and 29, the folder 72 can be deleted when the folder 72 is in the editable state. For example, when the user performs the tap operation Tt on the deletion icon 78 as illustrated in FIG. 28, the deletion unit 110 can delete the folder 72, and the stored tiles 70 are displayed on the display 14 in the display states before the tiles 70 are stored as illustrated in FIG. 29. This means that the user can cause the mobile phone 10 to delete an unnecessary folder 72. In other embodiments, the folder 72 may be deleted when the multi-touch operation is performed on the folder 72 not in the editable state, and then a touch operation (pinch-out operation) to separate two touch positions from each other is performed.

Figure 31:
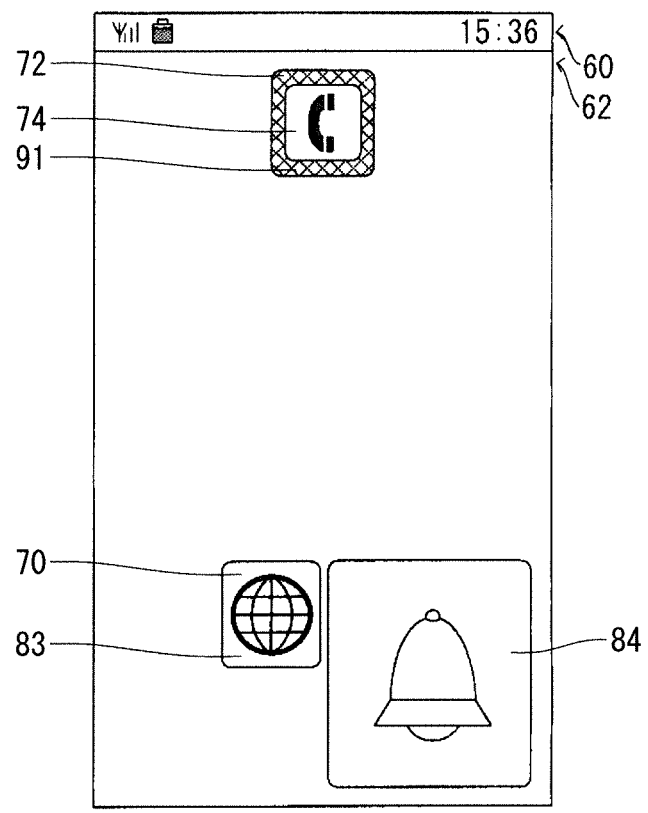
FIG. 31 illustrates an example of an image of a display set displayed after the display set illustrated in FIG. 30.
Figure 32:
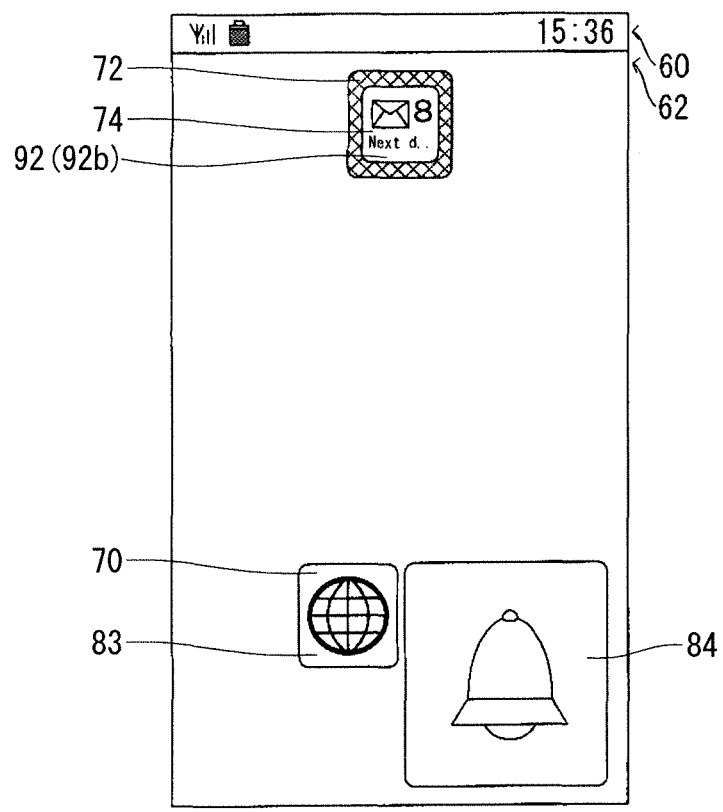
FIG. 32 illustrates an example of a thumbnail image showing live information different from live information illustrated in FIG. 30.

A case where the thumbnail images 74 corresponding to the tiles 70 stored in the folder 72 cannot be displayed at one time on the display 14 (in the display range of the folder 72) is described with reference to FIGS. 30 to 32. For example, in a case where the display size of the folder 72 is changed to the small size as illustrated in FIG. 30, a single thumbnail image 74 is displayed in the display range of the folder 72. Thus, switching of the thumbnail image 74 becomes possible, and the switching unit 111 can switch the thumbnail image 74 displayed on the display 14 (in the display range of the folder 72) at predetermined time (e.g., two to three seconds) intervals. For example, in the folder 72, the switching unit 111 can switch the thumbnail image 74 at predetermined time intervals in the order of the thumbnail image 90 of the SNS tile 80, a thumbnail image 92a of the email tile 82 (see FIG. 30), and the thumbnail image 91 of the phone tile 81 (see FIG. 31). After the thumbnail image 91 of the phone tile 81, the thumbnail image 90 of the SNS tile 80 is displayed again on the display 14. The thumbnail image 92 of the email tile 82 herein shows live information. Thus, when the thumbnail image 92 of the email tile 82 is displayed again through switching of the thumbnail image 74, the live information is changed (updated) to live information shown by a thumbnail image 92b of the email tile 82 as illustrated in FIG. 32.

Figure 33:
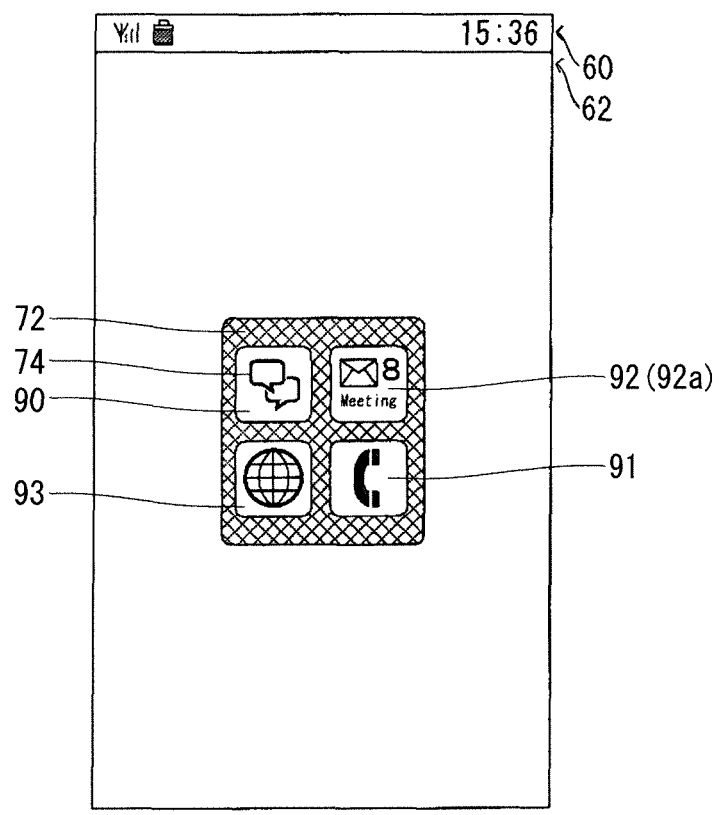
FIG. 33 illustrates an example of a display set in a certain folder.

FIGS. 33 to 35 illustrate an example of switching of the thumbnail image 74 in the folder 72 in which a plurality of thumbnail images 74 are displayed. For example, when five tiles 70 are stored in the folder 72 displayed at the medium size on the display 14, thumbnail images 74 corresponding to the respective tiles 70 cannot be displayed at one time on the display 14 (in the display range of the folder 72). Thus, as illustrated in FIG. 33, four thumbnail images 74 (the thumbnail image 90 of the SNS tile 80, the thumbnail image 91 of the phone tile 81, the thumbnail image 92 (92a) of the email tile 82, and the thumbnail image 93 of the browser tile 83) are displayed on the display 14 (in the display range of the folder 72) in the initial state. When the predetermined time has elapsed, the switching unit 111 displays the remaining thumbnail image 74 (the thumbnail image 94 of the alarm tile 84) on the display 14 (in the display range of the folder 72) as illustrated in FIG. 34. When the predetermined time has further elapsed, the switching unit 111 displays the four thumbnail images 74 (the thumbnail image 90 of the SNS tile 80, the thumbnail image 91 of the phone tile 81, the thumbnail image 92 (92a) of the email tile 82, and the thumbnail image 93 of the browser tile 83) again on the display 14 as illustrated in FIG. 35. As described above, when a plurality of tiles 70 are stored in the folder 72, the switching unit 111 can switch the thumbnail image 74 displayed on the display 14 (in the display range of the folder 72) to display all the thumbnail images 74 representing the tiles 70 stored in the folder 72 on the display 14. When the thumbnail image 74 shows the live information, the live information is updated (changed) through switching of the thumbnail image 74.

One or more thumbnail images 74 displayed in the display range of the folder 72 are herein referred to as a "display set". "Switching of the thumbnail image 74" is thus also referred to as "switching of the display set". For example, the number of display sets corresponding to the folder 72 having the small size is one to eight. The display set corresponding to the folder 72 having the small size includes a single thumbnail image 74. The number of display sets corresponding to the folder 72 having the medium size is one to two. The display set corresponding to the folder 72 having the medium size includes one to four thumbnail images 74. The number of display sets corresponding to the folder 72 having the large size is one. The display set corresponding to the folder 72 having the large size includes one to eight thumbnail images 74. The display set is not switched when the folder 72 has the large size, as all the thumbnail images 74 are displayed in the folder 72 having the large size. The live information is updated when the display set is switched. When the display set is not switched, however, the live information is updated at predetermined time intervals.

As described above, even if some thumbnail images 74 are not displayed on the display 14 (in the display range of the folder 72), the user can cause the mobile phone 10 to perform any function by waiting for a thumbnail image 74 corresponding to any tile 70 to be displayed.

Figure 36:
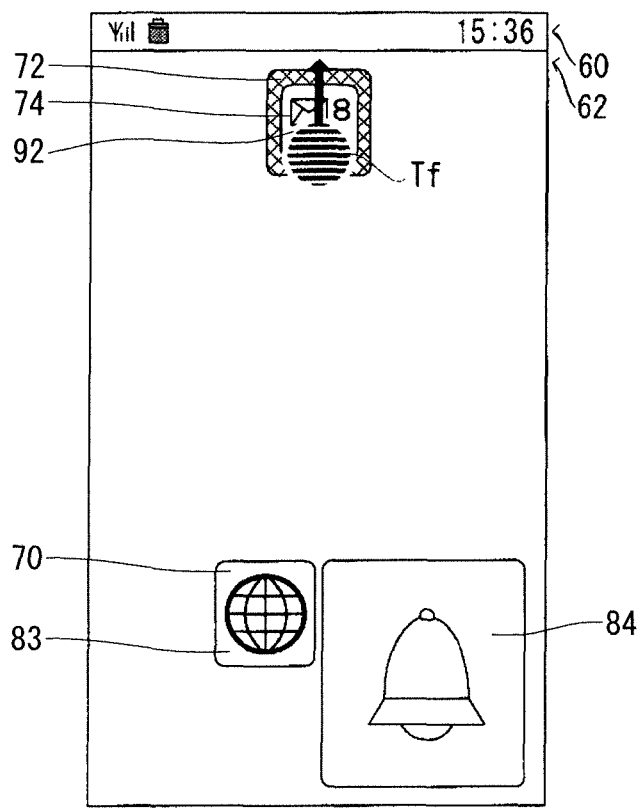
FIG. 36 illustrates an example of performing a flick operation on a folder.
Figure 37:
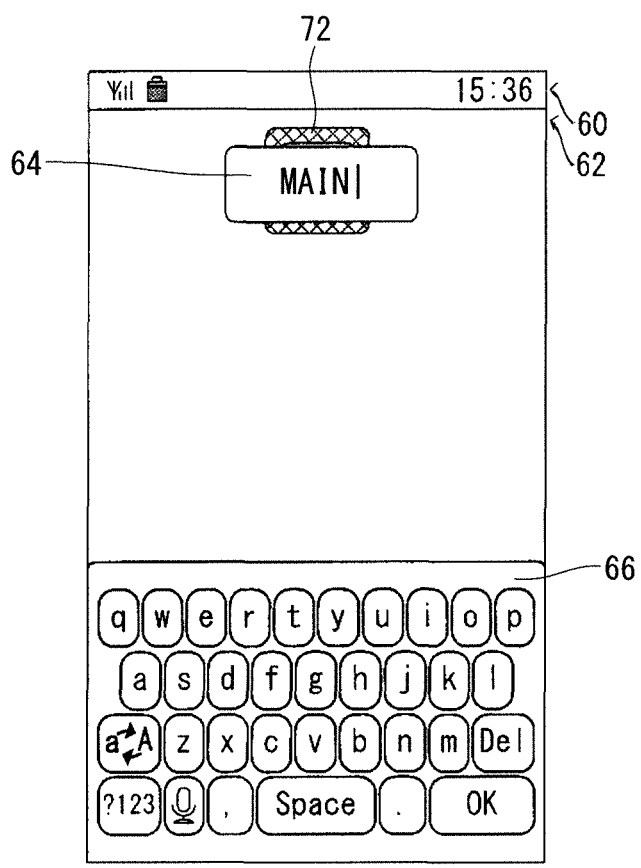
FIG. 37 illustrates an example of a name of a folder in a changeable state.

The flick operation performed on the folder 72 is described with reference to FIGS. 36 and 37. When the flick operation Tf is performed upwards on the folder 72 as illustrated in FIG. 36, a name of the folder 72 on which the flick operation Tf has been performed upwards becomes editable as illustrated in FIG. 37. When the name of the folder 72 is editable, the name change unit 112 can display, on the folder 72, a text input area 64 in which the current name of the folder 72 is written, and display a keyboard 66 in a lower portion of the function display area 62. The user can cause the mobile phone 10 to change the name of the folder to any name using the keyboard 66. A newly-created folder 72 is set to have a name "new folder".

Figure 38:
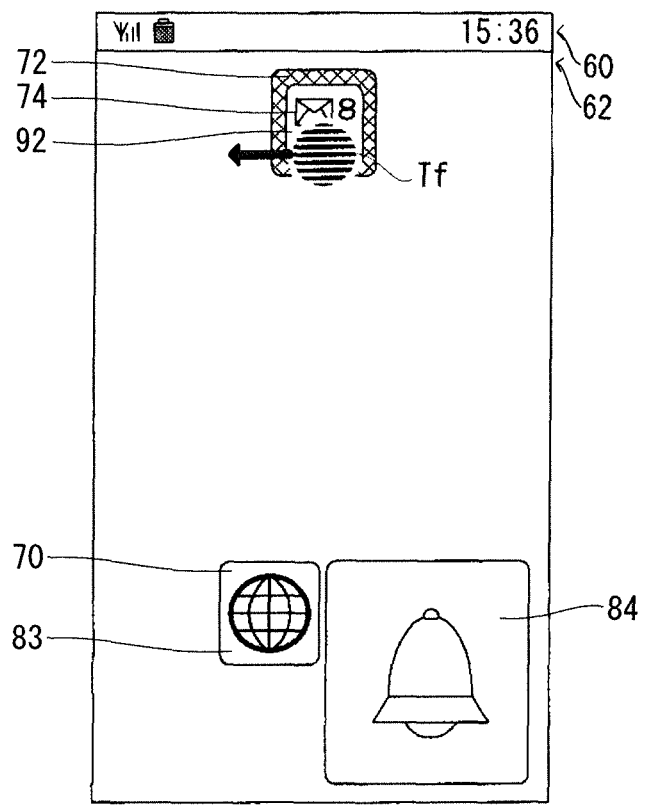
FIG. 38 illustrates another example of performing a flick operation on a folder.
Figure 39:
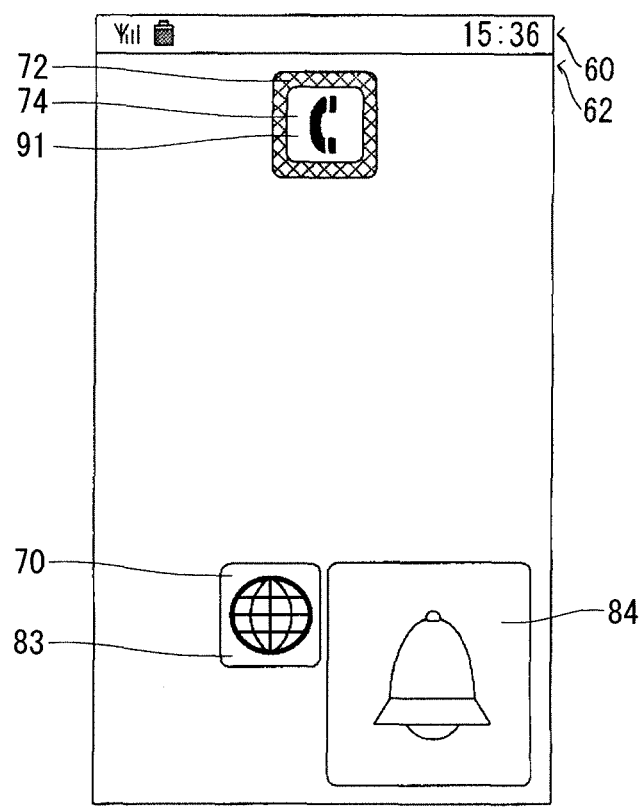
FIG. 39 illustrates an example of forcibly switching a display set.

Next, as illustrated in FIGS. 38 and 39, when a horizontal flick operation (particular touch operation) is performed on the folder 72, the switching unit 111 can forcibly switch the display set. For example, when the flick operation Tf is performed to the left on the folder 72 in which the thumbnail image 92 of the email tile 82 is displayed as illustrated in FIG. 38, the switching unit 111 can display a next display set, i.e., the thumbnail image 91 of the phone tile 81, on the display 14 (in the display range of the folder 72) as illustrated in FIG. 39. Although not illustrated, when the flick operation is performed to the right on the folder 72, the switching unit 111 can display a previous display set (the thumbnail image 90 of the SNS tile 80 in one embodiment described above) on the display 14 (in the display range of the folder 72). As described above, the user can display any target thumbnail image 74 on the display 14, and thus can easily cause the mobile phone 10 to perform the function corresponding to the tile 70 stored in the folder 72.

Although not illustrated, when a downward flick operation is performed on a folder 72 in which switching of the display set is possible, the stopping unit 113 can stop switching of the display set. As described above, the user can display a thumbnail image 74 of a tile 70 corresponding to a frequently-used function on the display 14 at all times. This improves convenience when the mobile phone 10 is caused to perform the function corresponding to the tile 70 stored in the folder 72. When the downward flick operation is performed again on a folder 72 in which switching of the display set is stopped, switching of the display set is resumed.

As can be understood from the above-mentioned description, the user can easily perform operations on the folder 72 in one embodiment.

Features of one embodiment have been briefly described above. Detailed description is given below using memory maps illustrated in FIGS. 40 and 41 and flow charts illustrated in FIGS. 42 to 51.

Figure 40:
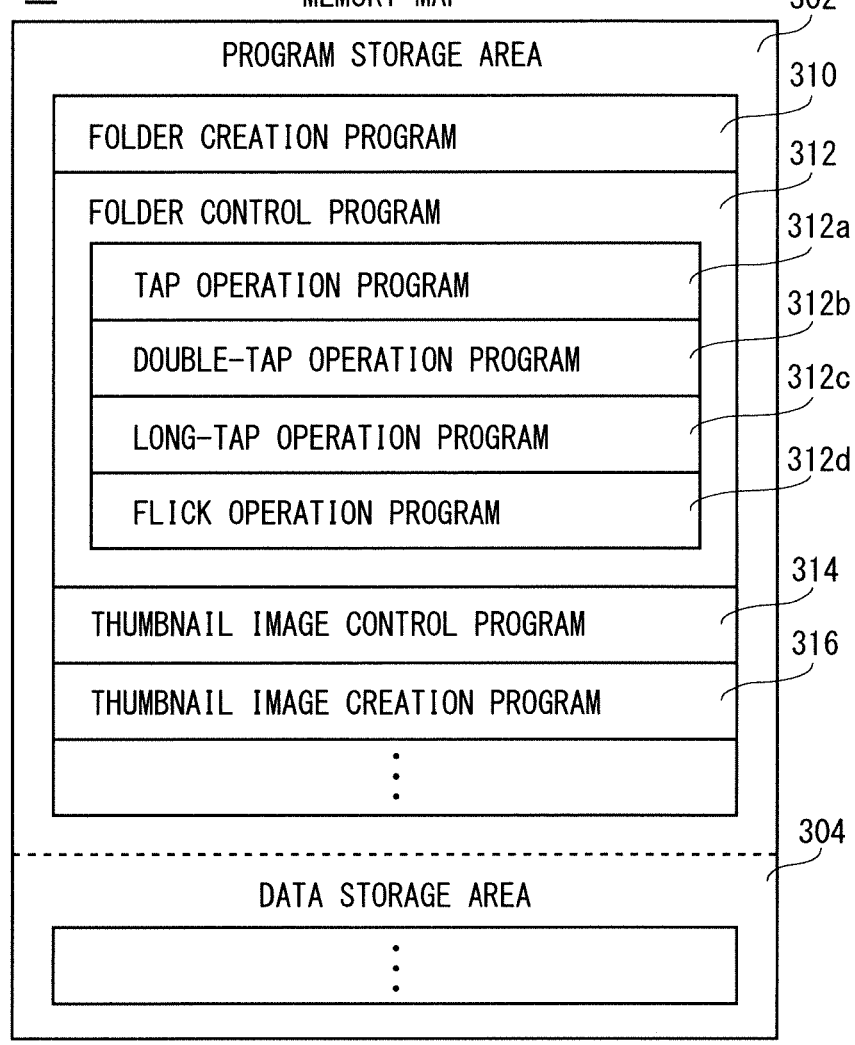
FIG. 40 illustrates an example of a memory map of the RAM.

Referring to FIG. 40, a program storage area 302 and a data storage area 304 are formed in the RAM 46. The program storage area 302 is an area for reading and storing (developing) part or all of program data preset in the flash memory 44 (FIG. 2) as described above.

In the program storage area 302, a folder creation program 310 run when the folder 72 is created in accordance with the touch operation, a folder control program 312 run when the touch operation is performed on the folder 72, a thumbnail image control program 314 for controlling switching and updating of the thumbnail image 74, and a thumbnail image creation program 316 for creating the thumbnail image 74 are stored. A tap operation program 312a, a double-tap operation program 312b, a long-tap operation program 312c, and a flick operation program 312d are stored in the program storage area 302 as subroutines of the folder control program 312.

Programs for performing applications and functions, such as the email function and the browser function, are stored in the program storage area 302.

Figure 41:
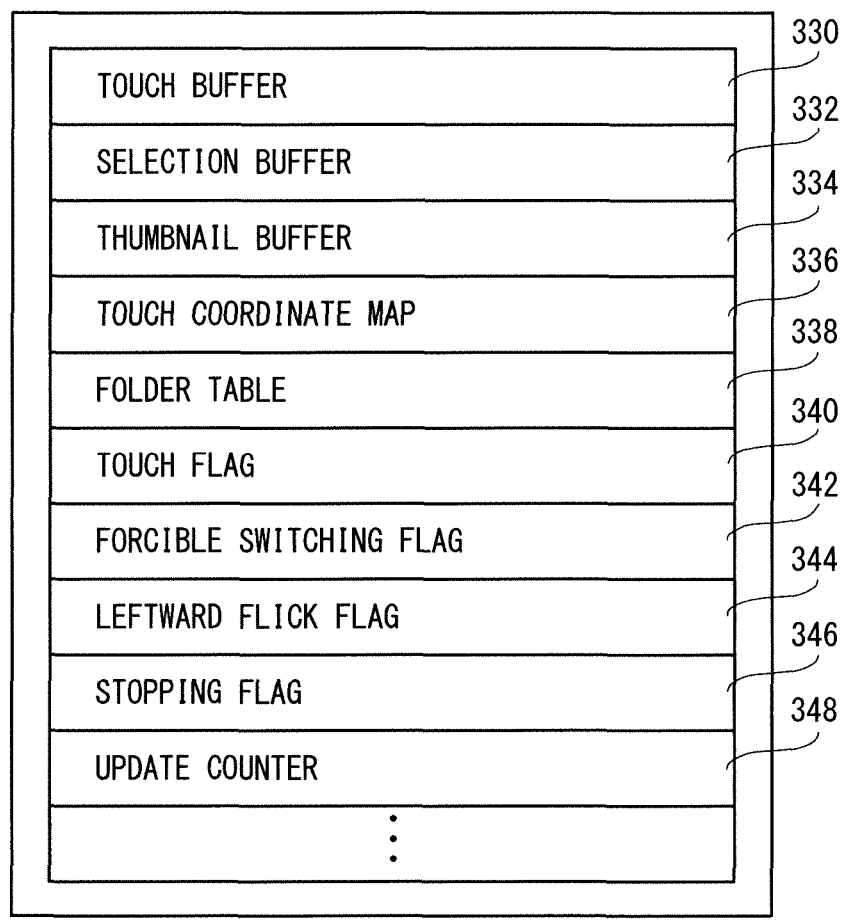
FIG. 41 illustrates an example of a data storage area of the memory map.

Next, referring to FIG. 41, in the data storage area 304 of the RAM 46, a touch buffer 330, a selection buffer 332, and a thumbnail buffer 334 are provided, and a touch coordinate map 336 and a folder table 338 are stored. A touch flag 340, a forcible switching flag 342, a leftward flick flag 344, a stopping flag 346, an update counter 348, and the like are provided in the data storage area 304.

Data on touch coordinates output from the touch panel control circuit 48 is stored in the touch buffer 330. Information on tiles 70 selected through the multi-touch operation is temporarily stored in the selection buffer 332. A thumbnail image 74 necessary for switching of the display set and updating of the live information (display state) is temporarily stored in the thumbnail buffer 334.

The touch coordinate map 336 is data for associating touch coordinates determined through the touch operation with display coordinates on the display 14. This means that results of the touch operation performed on the touch panel 16 are reflected in display on the display 14 based on the touch coordinate map 336.

The folder table 338 is a table having configuration illustrated in FIG. 14, for example, and stores information on the folder 72.

The touch flag 340 is a flag for determining whether the touch panel 16 is touched. The touch flag 340 is configured by a one-bit register, for example. When the touch flag 340 is tuned on (flagged), a data value "1" is set to the register. On the other hand, when the touch flag 340 is turned off (not flagged), a data value "0" is set to the register. The touch flag 340 is switched on and off based on output of the touch panel control circuit 48.

The forcible switching flag 342 is a flag for indicating that the flick operation has been performed on the folder 72. The leftward flick flag 344 is a flag for indicating that a leftward flick operation has been performed. The stopping flag 346 is a flag for indicating that the downward flick operation to stop switching has been performed.

The update counter 348 is a counter for measuring the predetermined time when the thumbnail image 74 is switched and the live information is changed. The update counter 348 starts counting when being initialized, and expires when the predetermined time (e.g., two to three seconds) has elapsed. The update counter 348 is also referred to as an update timer.

In the data storage area 304, output of the attitude sensor 50 may temporarily be stored, and another flag or timer (counter) required to run a program may be provided.

Figure 42:
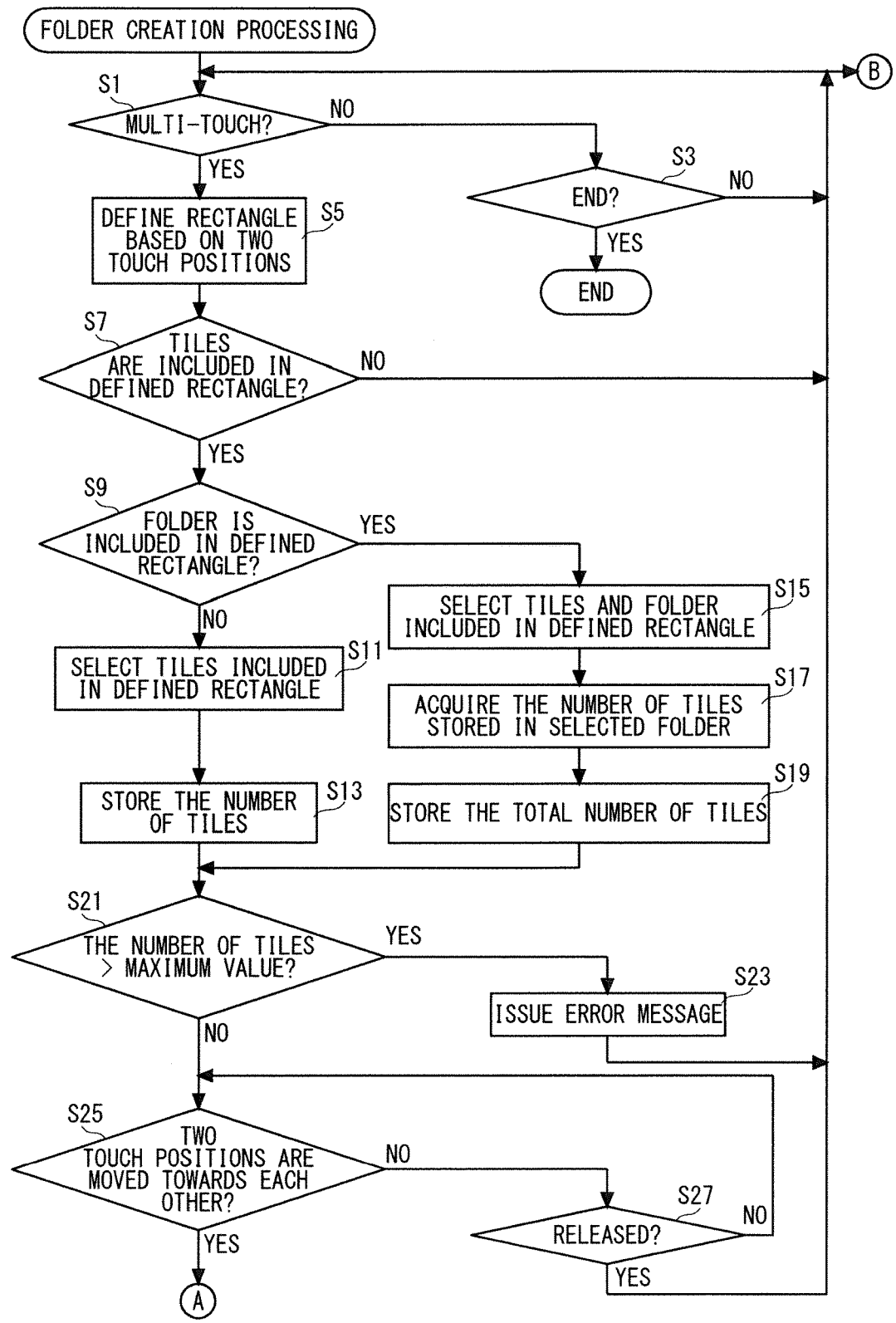
FIG. 42 illustrates a flow chart showing an example of a part of folder creation processing.
Figure 43:
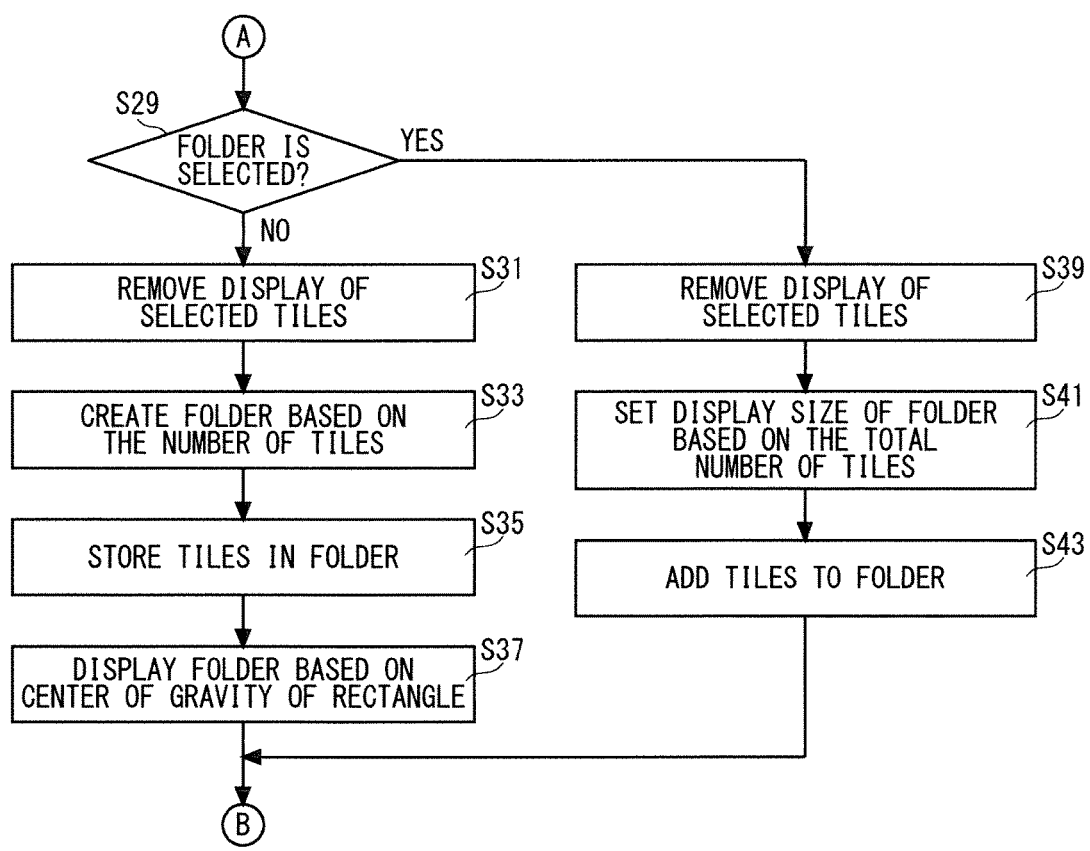
FIG. 43 illustrates a flow chart showing an example of another part of the folder creation processing and following the flow chart of FIG. 42.
Figure 44:
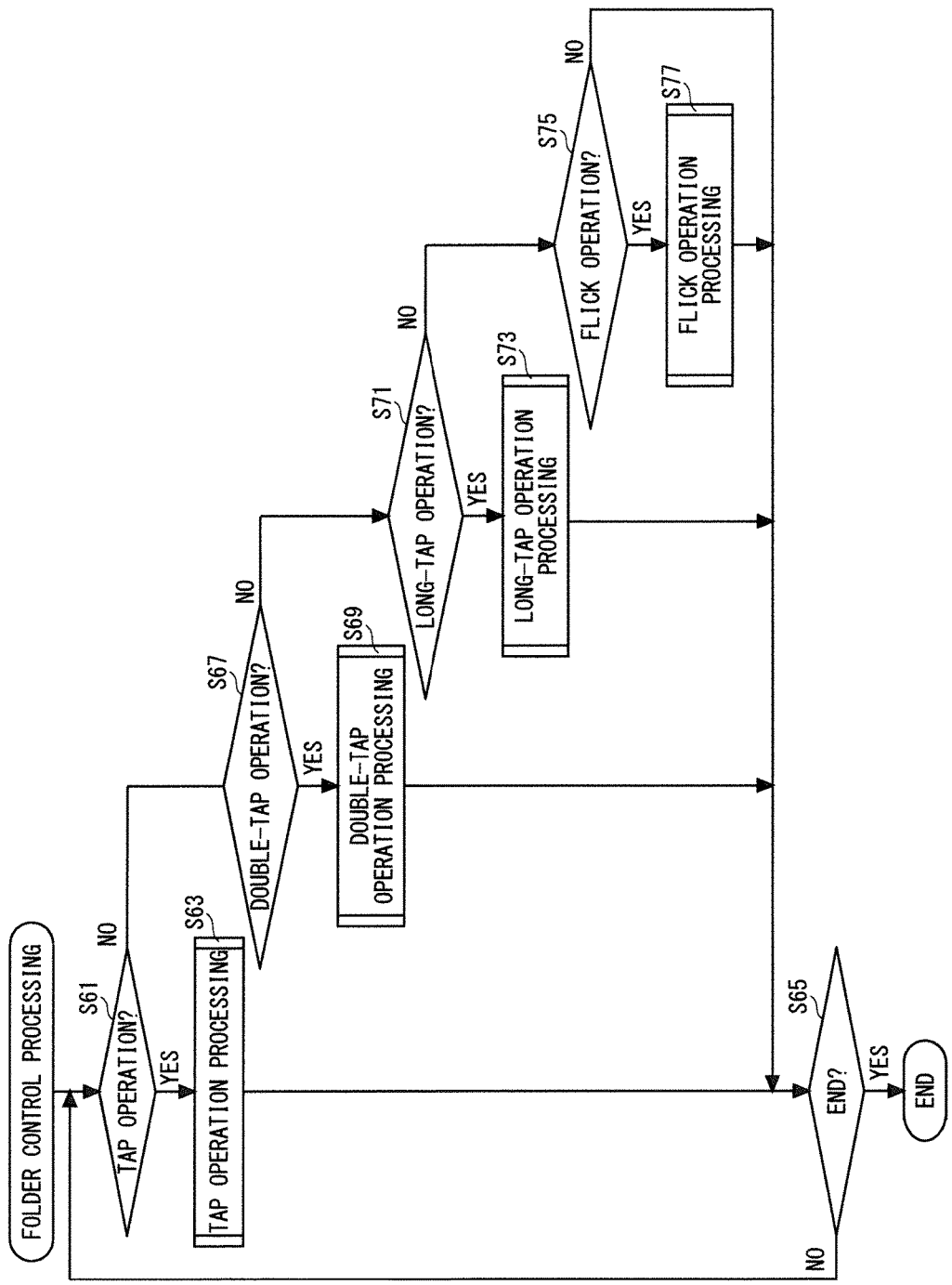
FIG. 44 illustrates a flow chart showing an example of folder control processing.
Figure 45:
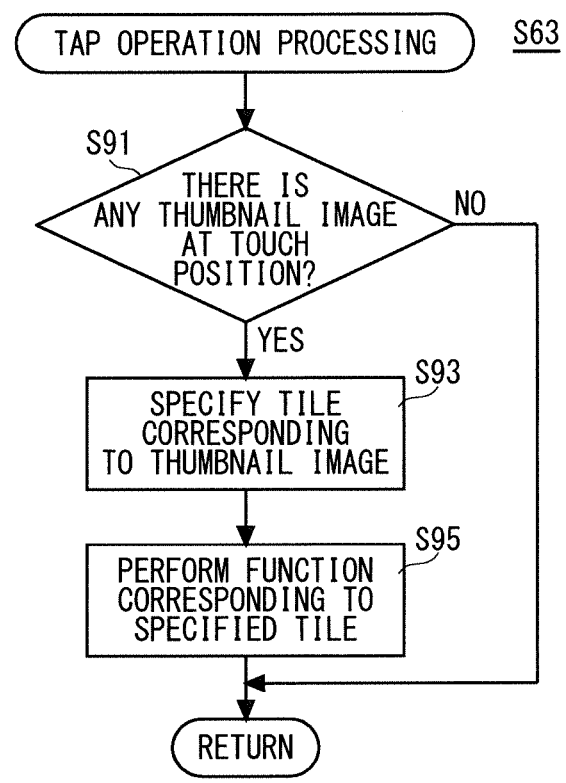
FIG. 45 illustrates a flow chart showing an example of tap operation processing.
Figure 47:
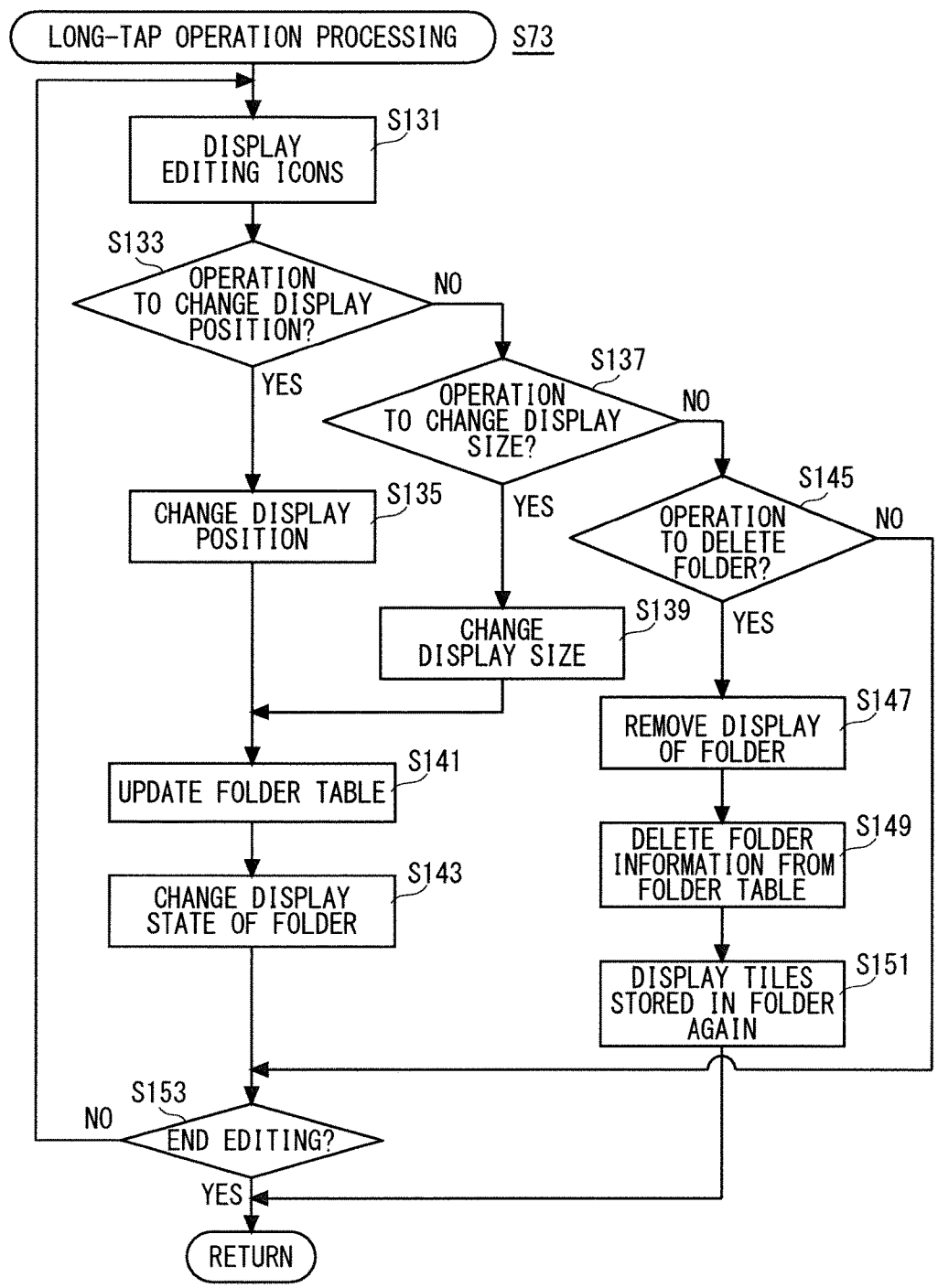
FIG. 47 illustrates a flow chart showing an example of long-tap operation processing.
Figure 48:
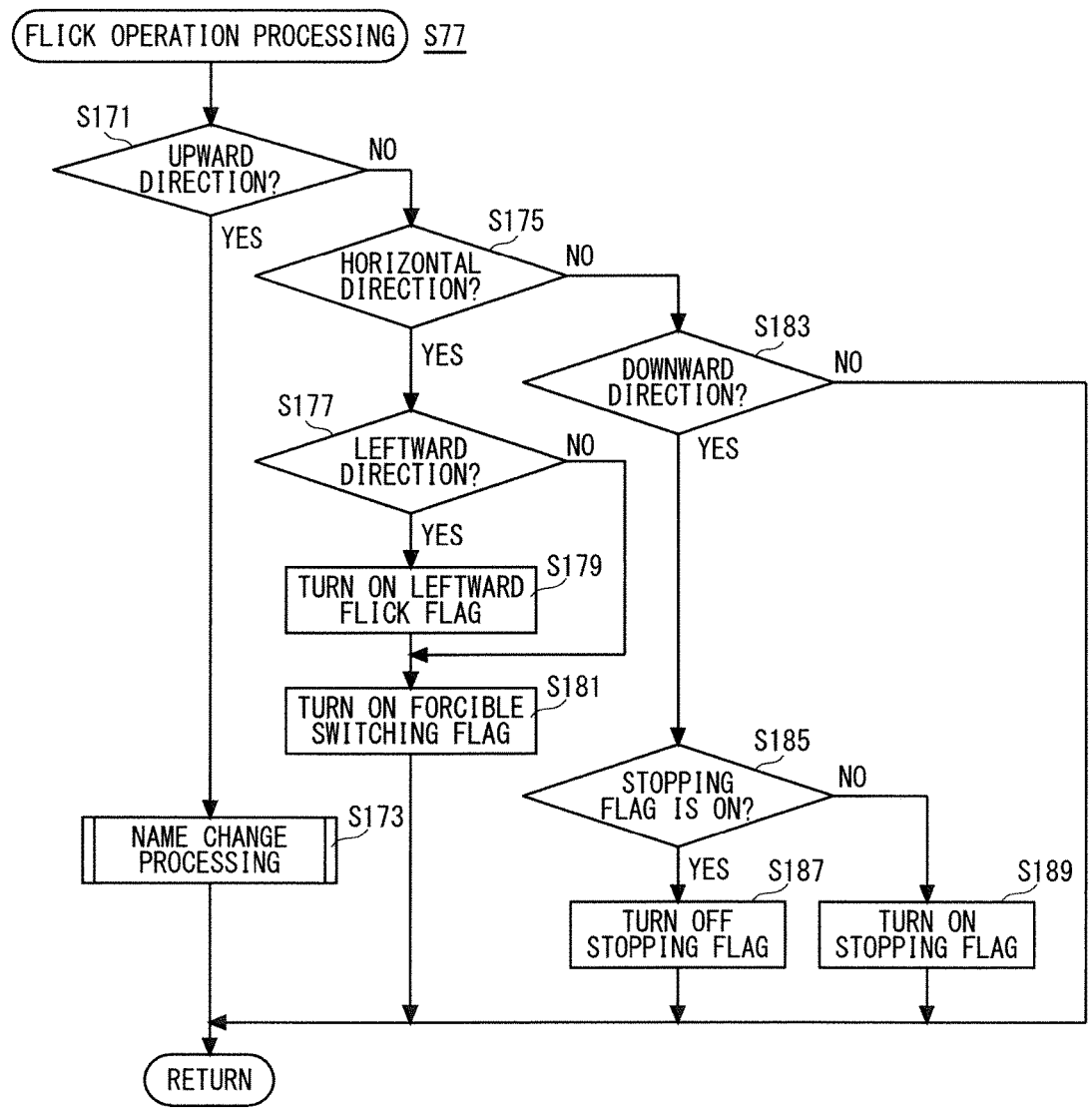
FIG. 48 illustrates a flow chart showing an example of flick operation processing.
Figure 49:
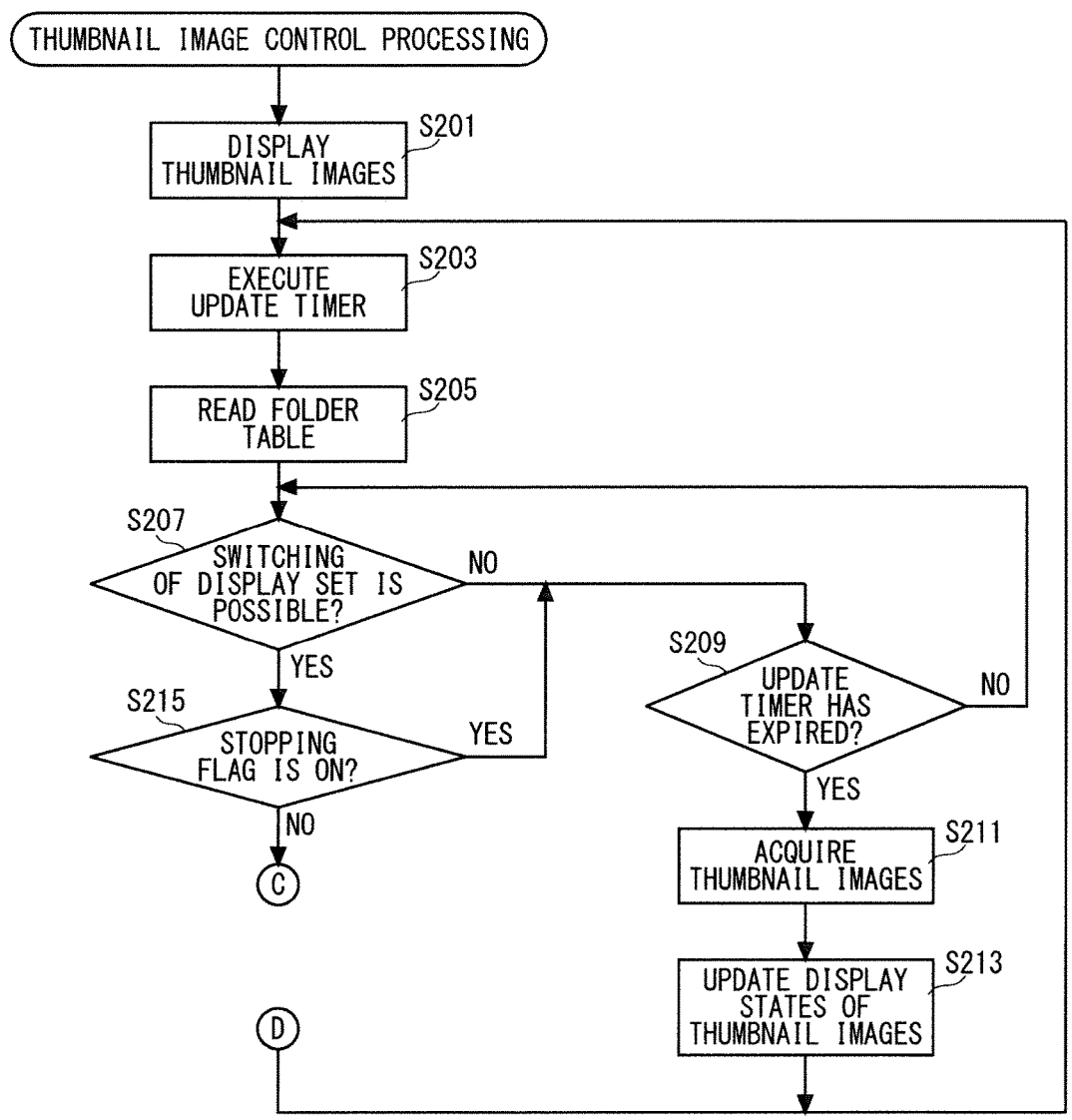
FIG. 49 illustrates a flow chart showing an example of a part of thumbnail image control processing.
Figure 50:
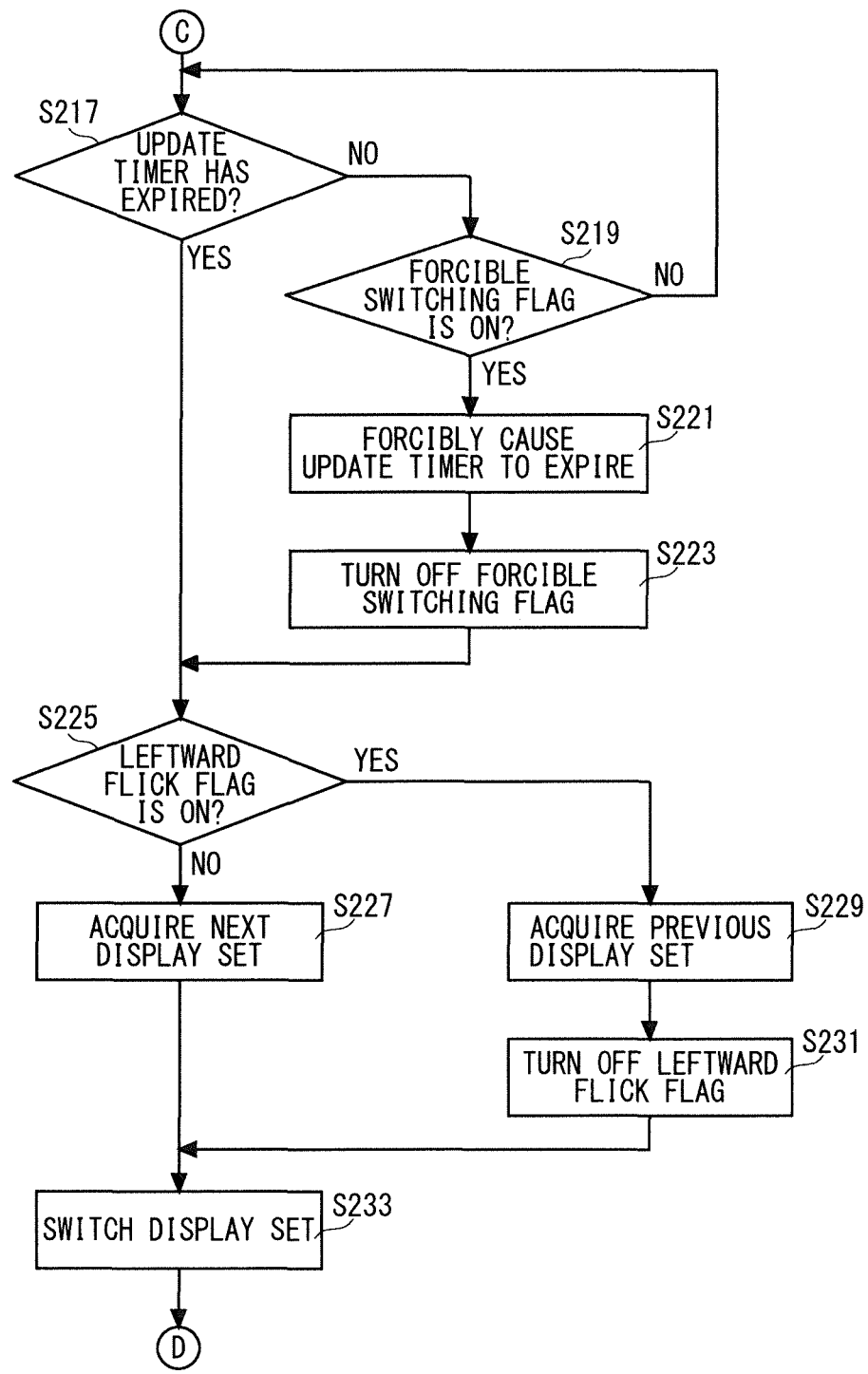
FIG. 50 illustrates a flow chart showing an example of another part of the thumbnail image control processing and following the flow chart of FIG. 49.
Figure 51:
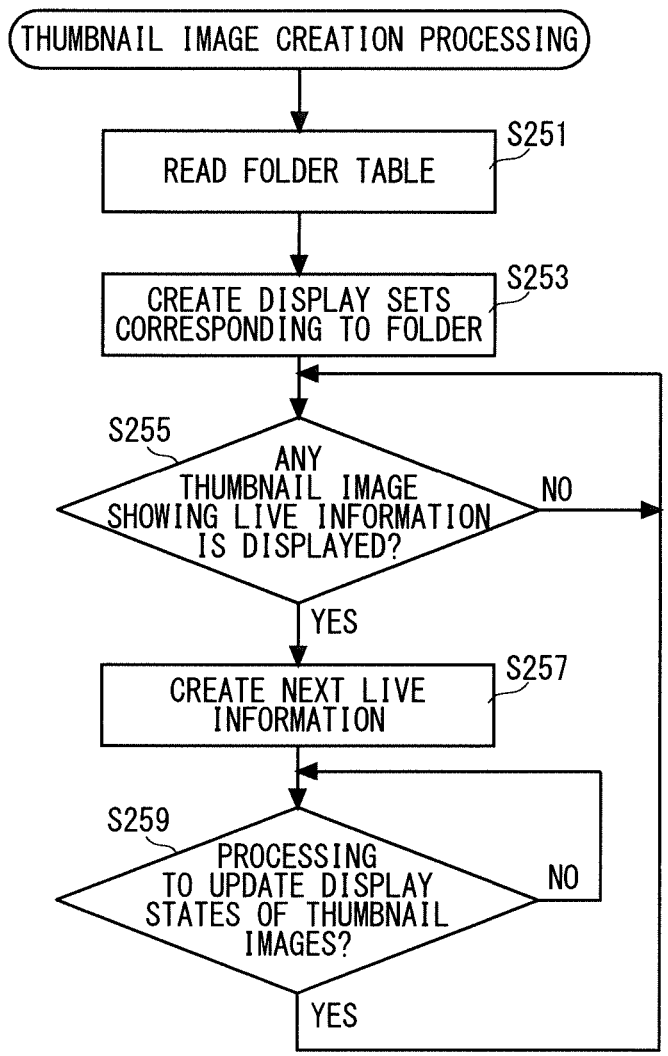
FIG. 51 illustrates a flow chart showing an example of thumbnail image creation processing.

The processor 30 can process a plurality of tasks, including folder creation processing illustrated in FIGS. 42 and 43, folder control processing illustrated in FIG. 44, tap operation processing illustrated in FIG. 45, double-tap operation processing illustrated in FIG. 46, long-tap operation processing illustrated in FIG. 47, flick operation processing illustrated in FIG. 48, thumbnail image control processing illustrated in FIGS. 49 and 50, and thumbnail image creation processing illustrated in FIG. 51, in parallel under control of an OS, such as a Windows®-based OS and a Linux®-based OS including Android® and iOS®.

The folder creation processing starts when the home screen is displayed on the display 14, for example. The processor 30 determines whether the multi-touch operation has been performed in step S1. This means that the processor 30 determines whether coordinates of two touch positions are stored in the touch buffer 330 with the touch flag 340 being on. If "NO" in step S1, i.e., the multi-touch operation has not been performed, the processor 30 determines whether the processing ends in step S3. It is determined whether an operation to remove display of the home screen has been performed. If "YES" in step S3, e.g., an operation to transition from the home screen to another screen has been performed, the processor 30 ends the folder creation processing. On the other hand, if "NO" in step S3, i.e., display of the home screen continues, the processor 30 returns to processing in step S1.

If "YES" in step S1, i.e., the multi-touch operation has been performed, the processor 30 defines a rectangle based on the two touch positions in step S5. For example, the rectangle is defined based on the two touch positions as illustrated in FIG. 5. Next, the processor 30 determines whether one or more tiles 70 are included in the defined rectangle in step S7. If "NO" in step S7, i.e., no tile 70 is included in the rectangle, the processor 30 returns to processing in step S1. On the other hand, if "YES" in step S7, i.e., the tiles 70 are included in the defined rectangle, the processor 30 proceeds to processing in step S9.

Next, the processor 30 determines whether a folder 72 is included in the defined rectangle in step S9. If "NO" in step S9, i.e., no folder 72 is included in the rectangle as illustrated in FIG. 5, the processor 30 (selection unit 100) selects the tiles 70 included in the defined rectangle in step S11. This means that information on the tiles 70 is stored in the selection buffer 332. A display manner (e.g., color) of the selected tiles 70 is changed. Next, the processor 30 stores the number of tiles 70 in step S13. This means that the number of tiles 70 stored in the selection buffer 332 is stored. When processing in step S13 ends, the processor 30 proceeds to processing in step S21.

If "YES" in step S9, e.g., the folder 72 is included in the rectangle as illustrated in FIG. 11, the processor 30 selects the tiles 70 and the folder 72 included in the defined rectangle in step S15. For example, in FIG. 11, the phone tile 81 and the folder 72 are selected, and information on the phone tile 81 and the folder 72 is stored in the selection buffer 332. Next, the processor 30 acquires the number of tiles 70 stored in the selected folder 72 in step S17. This means that the selected folder 72 is specified from the folder table 338, and the "number of tiles" stored in the folder 72 is read. Next, the processor 30 stores the total number of tiles 70 in step S19. This means that the sum (total number) of the number of tiles 70 stored in the folder 72 and the number of selected tiles 70 is calculated.

Next, the processor 30 determines whether the number of selected tiles 70 is larger than a maximum value of the number of tiles 70 that can be stored in the folder 72 in step S21. If "YES" in step S21, i.e., too many tiles 70 are selected to be stored in the folder 72, the processor 30 issues an error message in step S23 and returns to processing in step S1. For example, a character string "selected tiles cannot be stored in folder" is displayed on the display 14. On the other hand, if "NO" in step S21, i.e., the selected tiles 70 can be stored in the folder 72, the processor 30 determines whether the two touch positions are moved towards each other in step S25. This means that it is determined whether the pinch-in operation has been performed. It is determined that the pinch-in operation has been performed when a movement distance of each of the two touch positions is larger than a threshold in step S25.

If "NO" in step S25, e.g., the two touch positions have not changed, the processor 30 determines whether releasing has been performed in step S27. This means that it is determined whether the touch flag 340 has been turned off. If "YES" in step S27, e.g., the user releases fingers with which the multi-touch operation is performed from the touch panel 16, the processor 30 returns processing in step S1. On the other hand, if "NO" in step S27, i.e., the user continues the multi-touch operation, the processor 30 returns to processing in step S25.

Next, if "YES" in step S25, i.e., the pinch-in operation has been performed, the processor 30 determines whether the folder 72 is selected in step S29. This means that it is determined whether at least part of the folder 72 is included in the rectangle. If "NO" in step S29, e.g., no folder 72 is selected as illustrated in FIG. 5, the processor 30 removes display of the selected tiles 70 in step S31. This means that display of the selected tiles 70 is removed as the selected tiles 70 are stored in the folder 72. Next, the processor 30 (creation unit 101) creates the folder 72 based on the number of tiles 70 in step S33. For example, if the number of selected tiles 70 is three, the creation unit 101 creates the folder 72 having the medium size. When the creation unit 101 creates the folder 72, folder information is added to the folder table 338. Next, the processor 30 (storing unit 102) stores the tiles 70 in the folder 72 in step S35. This means that the selected tiles 70 are stored in the folder 72 created by the creation unit 101 based on the information on the tiles 70 stored in the selection buffer 332. When the tiles 70 are stored in the folder 72, information on the stored tiles 70 is added to the folder table 338. Next, the processor 30 (first display control unit 103) displays the folder 72 based on the center of gravity of the rectangle in step S37. This means that the folder 72 is displayed on the display 14 so that the center of gravity of the rectangle is included in the display range of the created folder 72. When processing in step S37 ends, the processor 30 returns to processing in step S1.

If "YES" in step S29, e.g., the folder 72 is selected as illustrated in FIG. 11, the processor 30 removes display of the selected tiles 70 in step S39. This means that display of the selected tiles 70 is removed as the selected tiles 70 are stored in the folder 72. Next, the processor 30 sets the display size of the folder 72 based on the total number of tiles 70 in step S41. For example, if the total number of tiles 70 is five, and the current display size of the folder 72 is the medium size, the display size of the folder 72 is changed (set) to the large size. Next, the processor 30 (addition unit 105) adds (stores) the tiles 70 to (in) the folder 72 in step S43. This means that the addition unit 105 adds (stores) the tiles 70 to (in) the folder 72 based on the information on the tiles 70 stored in the selection buffer 332. When the display size of the folder 72 is set in step S41, and the tiles 70 are added (stored) in step S43, the results are reflected in the folder table 338. When processing in step S43 ends, the processor 30 returns to processing in step S1.

FIG. 44 illustrates a flow chart of the folder control processing. The folder control processing starts when the home screen including the folder 72 is displayed. The processor 30 determines whether the tap operation has been performed in step S61. This means that it is determined whether the tap operation has been performed on the folder 72. If "YES" in step S61, i.e., the tap operation has been performed on the folder 72, the processor 30 performs the tap operation processing in step S63. Next, the processor 30 determines whether the processing ends in step S65. For example, it is determined whether an operation to end display of the home screen has been performed. If "YES" in step S65, e.g., the operation to transition from the home screen to the other screen has been performed, the processor 30 ends the folder control processing. On the other hand, if "NO" in step S65, i.e., display of the home screen continues, the processor 30 returns to processing in step S61. Description on the tap operation processing in step S63 is herein omitted as the tap operation processing is described in detail with use of the flow chart of FIG. 45.

If "NO" in step S61, i.e., the tap operation has not been performed, the processor 30 determines whether the double-tap operation has been performed in step S67. This means that it is determined whether the double-tap operation has been performed on the folder 72. If "YES" in step S67, i.e., the double-tap operation has been performed on the folder 72, the processor 30 performs the double-tap operation processing in step S69, and proceeds to processing in step S65. Description on the double-tap operation processing is herein omitted as the double-tap operation processing is described in detail with use of the flow chart of FIG. 46.

If "NO" in step S67, i.e., the double-tap operation has not been performed, the processor 30 determines whether the long-tap operation has been performed in step S71. This means that it is determined whether the long-tap operation has been performed on the folder 72. If "YES" in step S71, i.e., the long-tap operation has been performed on the folder 72, the processor 30 performs the long-tap operation processing in step S73, and proceeds to processing in step S65. Description on the long-tap operation processing is herein omitted as the long-tap operation processing is described in detail with use of the flow chart of FIG. 47.

If "NO" in step S71, i.e., the long-tap operation has not been performed, the processor 30 determines whether the flick operation has been performed in step S75. This means that it is determined whether the flick operation has been performed on the folder 72. If "YES" in step S75, i.e., the flick operation has been performed on the folder 72, the processor 70 performs the flick operation processing in step S77, and proceeds to processing in step S65. Description on the flick operation processing is herein omitted as the flick operation processing is described in detail with use of the flow chart of FIG. 48.

If "NO" in step S75, i.e., the flick operation has not been performed on the folder 72, the processor 30 proceeds to processing in step S65.

FIG. 45 illustrates a flow chart of the tap operation processing. When processing in step S63 is performed in the folder control processing illustrated in FIG. 44, the processor 30 determines whether there is any thumbnail image 74 at the touch position in step S91. This means that it is determined whether the tap operation has been performed on the thumbnail image 74. In processing in step S91, determination is made based on the touch position stored in the touch buffer 330 and the display range of the thumbnail image 74 stored in the folder table 338.

If "YES" in step S91, i.e., the tap operation has been performed on the thumbnail image 74, the processor 30 specifies the tile 70 corresponding to the thumbnail image 74 in step S93. Specifically, the processor 30 specifies the tile 70 corresponding to the thumbnail image 74 on which the tap operation has been performed based on the column of the thumbnail images 74 included in the folder table 338. Next, the processor 30 (performance unit 106) performs a function corresponding to the specified tile 70 in step S95. For example, if the tap operation has been performed on the thumbnail image 92 corresponding to the email function as illustrated in FIG. 15, the email tile 82 is specified, and the performance unit 106 performs the email function. When processing in step S95 ends, the processor 30 ends the tap operation processing, and returns to the folder control processing. If "NO" in step S91, i.e., the tap operation has not been performed on the thumbnail image 74, the processor 30 ends the tap operation processing, and returns to the folder control processing.

FIG. 46 illustrates a flow chart of the double-tap operation processing. When processing in step S69 is performed in the folder control processing illustrated in FIG. 44, the processor 30 (object display control unit 107) displays one or more tiles 70 stored in the folder 72 on the display 14 in step S101. This means that the expanded folder image OF including images of the tiles 70 stored in the folder 72 is displayed on the display 14 as illustrated in FIG. 18. Next, the processor 30 determines whether the flick operation has been performed on any of the tiles 70 in step S103. This means that it is determined whether an operation to extract the tile 70 from the folder 72 has been performed. If "YES" in step S103, e.g., the flick operation has been performed on the tile 70 as illustrated in FIG. 19, the processor 30 extracts the flicked tile 70 from the folder 72 in step S105. This means that the image of the tile 70 on which the flick operation has been performed is removed from the expanded folder image OF. Information on the extracted tile 70 is deleted from the folder table 338. When processing in step S105 ends, the processor 30 proceeds to processing in step S111.

If "NO" in step S103, i.e., the flick operation has not been performed on the tile 70, the processor 30 determines whether the tap operation has been performed on any of the tiles 70 in step S107. If "YES" in step S107, i.e., the tap operation has been performed on the tile 70 included in the expanded folder image OF, the processor 30 performs a function corresponding to the tile 70 in step S109. This means that, if the tap operation has been performed on the email tile 82 illustrated in FIG. 18, the email function is performed. When processing to perform the function ends in step S109, the processor 30 ends the double-tap operation processing, and returns to the folder control processing. The processor 30 ends the folder control processing after returning to the folder control processing as the application is being run.

If "NO" in step S107, i.e., the tap operation has not been performed on the tile 70, the processor 30 determines whether the operation to close the folder 72 has been performed in step S111. For example, it is determined whether the menu key 22c has been pressed. If "NO" in step S111, i.e., the operation to close the folder 72 has not been performed, the processor 30 returns to processing in step S101. On the other hand, if "YES" in step S111, i.e., the operation to close the folder 72 has been performed, the processor 30 ends the double-tap operation processing, and returns to the folder control processing.

FIG. 47 illustrates a flow chart of the long-tap operation processing. When processing in step S73 is performed in the folder control processing illustrated in FIG. 44, the processor 30 displays the editing icons in step S131. For example, the size change icon 76 and the deletion icon 78 are displayed on the display 14 so as to overlap the folder 72 as illustrated in FIG. 23. When the editing icons are displayed, the display manner of the folder 72 changes.

Next, the processor 30 determines whether an operation to change the display position has been performed in step S133. This means that it is determined whether the slide operation has been performed on the folder 72. If "YES" in step S133, e.g., the slide operation has been performed on the folder 72 as illustrated in FIG. 24, the processor 30 (display position change unit 108) changes the display position of the folder 72 displayed on the display 14 in step S135. This means that the display position of the folder 72 displayed on the display 14 is changed in accordance with the slide operation. When processing in step S135 ends, the processor 30 proceeds to processing in step S141.

If "NO" in step S133, i.e., the operation to change the display position has not been performed, the processor 30 determines whether an operation to change the display size has been performed in step S137. For example, it is determined whether the size change icon 76 has been touched, and then the slide operation has been performed. If "YES" in step S137, e.g., the operation to change the display size of the folder 72 has been performed as illustrated in FIG. 26, the processor 30 (display size change unit 109) changes the display size of the folder 72 in step S139. This means that the display size of the folder 72 is changed based on the direction and the amount of the slide operation.

Next, the processor 30 updates the folder table 338 in step S141, and changes a display state of the folder 72 in step S143. This means that, since the display position or the display size of the folder 72 has been changed, the results of the change are reflected in the folder table 338 and the display state of the folder 72. When processing in step S143 ends, the processor 30 proceeds to processing in step S153.

If "NO" in step S137, i.e., the operation to change the display size has not been performed, the processor 30 determines whether an operation to delete the folder 72 has been performed in step S145. This means that it is determined whether the tap operation has been performed on the deletion icon 78. If "YES" in step S145, e.g., the tap operation has been performed on the deletion icon 78 as illustrated in FIG. 28, the processor 30 removes display of the folder 72 in step S147. This means that display of the folder 72 corresponding to the deletion icon 78 is deleted. Next, the processor 30 (deletion unit 110) deletes folder information of the folder 72 corresponding to the deletion icon 78 from the folder table 338 in step S149. This means that the folder information corresponding to the folder whose display has been removed is deleted. Next, the processor 30 displays one or more tiles 70 stored in the folder 72 again in step S151. For example, the SNS tile 80, the phone tile 81, and the email tile 82 stored in the folder 72 are displayed in approximately the same state as a state before these tiles are stored in the folder 72 as illustrated in FIG. 29. When processing in step S151 ends, i.e., the folder 72 is deleted, the processor 30 ends the long-tap operation processing, and returns to the folder control processing.

If "NO" in step S145, i.e., the operation to delete the folder 72 has not been performed, the processor 30 determines whether to end editing in step S153. This means that it is determined whether an operation to end editing of the folder 72 has been performed. Specifically, it is determined whether the menu key 22c has been operated. If "NO" in step S153, i.e., the operation to end editing has not been performed, the processor 30 returns to processing in step S131. If "YES" in step S153, i.e., the operation to end editing has been performed, the processor 30 ends the long-tap operation processing, and returns to the folder control processing.

FIG. 48 illustrates a flow chart of the flick operation processing. When processing in step S77 is performed in the folder control processing illustrated in FIG. 44, the processor 30 determines whether the direction is an upward direction in step S171. This means that it is determined whether the flick operation is an upward flick operation. If "YES" in step S171, e.g., the upward flick operation has been performed on the folder 72 to change the name of the folder 72, the processor 30 (name change unit 112) performs name change processing in step S173. When the name change unit 112 performs the name change processing, the text input area 64 and the keyboard 66 are displayed on the display 14 as illustrated in FIG. 37, for example. When the name change processing ends, the processor 30 ends the flick operation processing, and returns to the folder control processing.

If "NO" in step S171, i.e., the direction of the flick operation is not the upward direction, the processor 30 determines whether the direction is the horizontal direction in step S175. This means that it is determined whether the direction of the flick operation is the horizontal direction. If "YES" in step S175, i.e., the horizontal flick operation has been performed, the processor 30 determines whether the direction is a leftward direction in step S177 to forcibly switch the display set, for example. This means that it is determined whether the flick operation to display the previous display set has been performed. If "YES" in step S177, i.e., the direction of the flick operation is the leftward direction, the processor 30 turns on the leftward flick flag 344 in step S179. This means that, since the flick operation to display the previous display set has been performed, the leftward flick flag 344 is turned on. If "NO" in step S177, i.e., a rightward flick operation has been performed, the processor 30 omits processing in step S179, and proceeds to processing in step S181. The processor 30 turns on the forcible switching flag 342 in step S181. This means that, since the flick operation to forcibly switch the display set has been performed, the forcible switching flag 342 is turned on. When processing in step S181 ends, the processor 30 ends the flick operation processing, and returns to the folder control processing.

If "NO" in step S175, i.e., the direction of the flick operation is not the horizontal direction, the processor 30 determines whether the direction is a downward direction in step S183. This means that it is determined whether the direction of the flick operation is the downward direction. If "YES" in step S183, e.g., the downward flick operation has been performed to stop or resume switching of the display set, the processor 30 determines whether the stopping flag 346 is on in step S185. This means that it is determined whether switching of the display set is stopped. If "YES" in step S185, i.e., switching of the display set is stopped, the processor 30 turns off the stopping flag 346 in step S187. This means that the stopping flag 346 is turned off to resume switching of the display set. On the other hand, if "NO" in step S185, i.e., the stopping flag 346 is off, the processor 30 (stopping unit 113) turns on the stopping flag 346 in step S189. This means that the stopping unit 113 turns on the stopping flag 346 to stop switching of the display set.

If "NO" in step S183 as the direction of the flick operation cannot be determined normally or when the stopping flag 346 is turned on or off, the processor 30 ends the flick operation processing, and returns to the folder control processing.

FIGS. 49 and 50 illustrate flow charts of the thumbnail image control processing. The thumbnail image control processing starts when the home screen is displayed, for example. The processor 30 (second display control unit 104) displays one or more thumbnail images 74 on the display 14 in step S201. This means that the processor 30 (second display control unit 104) reads one or more thumbnail images 74 (a display set) corresponding to the displayed folder from the thumbnail buffer 334, and displays the read thumbnail images 74 in the display range of the folder 72.

Next, the processor 30 executes the update timer in step S203. This means that the update counter 348 is initialized to measure time from display of the thumbnail images 74.

Next, the processor 30 reads the folder table 338 in step S205. The processor 30 then determines whether switching of the display set is possible in step S207. This means that the processor 30 determines whether switching of the display set is set to be possible in the column of switching included in the folder table 338. If "NO" is step S207, i.e., switching of the display set is set to be not possible, the processor 30 determines whether the update timer has expired in step S209. This means that it is determined whether the predetermined time has elapsed since display of the thumbnail images 74. If "YES" in step S209, i.e., the predetermined time has elapsed since display of the thumbnail images 74, the processor 30 acquires one or more thumbnail images 74 in step S211. This means that the processor 30 reads data on one or more thumbnail images 74 corresponding to the current display set from the thumbnail buffer 334. Next, the processor 30 updates display states of the thumbnail images 74 in step S213. This means that the current display set is updated by the acquired thumbnail images 74. In this case, when there is any thumbnail image 74 showing live information, the thumbnail image 74 shows the next live information. When processing in step S213 ends, the processor 30 returns to processing in step S203.

If "NO" in step S209, i.e., the predetermined time has not elapsed since display of the thumbnail images 74, the processor 30 returns to processing in step S207. If "YES" in step S207, i.e., switching of the display set is set to be possible, the processor 30 determines whether the stopping flag 346 is on in step S215. This means that it is determined whether switching of the display set is stopped. If "YES" in step S215, i.e., switching of the display set is stopped, the processor 30 proceeds to processing in step S209.

On the other hand, if "NO" in step S215, i.e., switching of the display set is not stopped, the processor 30 determines whether the update timer has expired in step S217 as in step S209. If "NO" in step S217, i.e., the predetermined time has not elapsed since display of the thumbnail images 74, the processor 30 determines whether the forcible switching flag 342 is on in step S219. This means that it is determined whether the horizontal flick operation to forcibly switch the display set has been performed on the folder 72. If "YES" in step S219, the processor 30 forcibly causes the update timer to expire in step S221. This means that the update timer is forcibly caused to expire as the flick operation to forcibly switch the display set has been performed to eliminate the need for the update timer to measure the predetermined time. Next, the processor 30 turns off the forcible switching flag 342 in step S223. This means that the forcible switching flag 342 is turned off as the update timer does not measure the predetermined time in the next processing if the forcible switching flag 342 remains on. When processing in step S223 ends, the processor 30 proceeds to processing in step S225.

If "NO" in step S219, i.e., the horizontal flick operation has not been performed, the processor 30 returns to processing in step S217. If "YES" in step S217, i.e., the predetermined time has elapsed since display of the thumbnail images 74, the processor 30 proceeds to processing in step S225.

Next, the processor 30 determines whether the leftward flick flag 344 is on in step S225. This means that it is determined whether the leftward flick operation has been performed to display the previous display set. If "NO" in step S225, i.e., the update timer has expired or the rightward flick operation has been performed, the processor 30 acquires the next display set in step S227. This means that the next display set is acquired from the thumbnail buffer 334. When processing in step S227 ends, the processor 30 proceeds to processing in step S233.

On the other hand, if "YES" in step S225, i.e., the leftward flick operation has been performed, the processor 30 acquires the previous display set in step S229. This means that the previous display set is acquired from the thumbnail buffer 334 to display the previous display set again. Next, the processor 30 turns off the leftward flick flag 344 in step S231. This means that the leftward flick flag 344 is tuned off to avoid false determination that the leftward flick operation has been performed in the next processing. When processing in step S231 ends, the processor 30 proceeds to processing in step S233.

When the display set is acquired as described above, the processor 30 (switching unit 111) switches the display set in step S233. For example, when the predetermined time has elapsed since display of the thumbnail images 74 on the display 14 or when the rightward flick operation has been performed, the switching unit 111 displays the thumbnail images 74 of the next display set on the display 14. On the other hand, when the leftward flick operation has been performed, the switching unit 111 displays the thumbnail images 74 of the previous display set on the display 14. When any thumbnail image 74 showing live information is included in the previous or the next display set, the live information shown by the thumbnail image 74 is updated. When processing in step S233 ends, the processor 30 returns to processing in step S203.

FIG. 51 illustrates a flow chart of the thumbnail image creation processing. The thumbnail image creation processing starts when the home screen is displayed, for example. The processor 30 reads the folder table 338 in step S251. This means that the folder table 338 is read to create one or more thumbnail images 74 to be displayed. Next, the processor 30 creates one or more display sets corresponding to the folder 72 in step S253. In the case of the folder 72 illustrated in FIG. 33, for example, the display set illustrated in FIG. 33 and the display set illustrated in FIG. 34 are created in advance. Each of the created display sets is stored in the thumbnail buffer 334. The thumbnail images 74 are displayed and the display set is switched in the thumbnail image control processing based on the display sets created in step S253.

Next, the processor 30 determines whether any thumbnail image 74 showing live information is displayed in step S255. For example, it is determined whether the thumbnail image 92 of the email tile 82 showing information on an incoming email as the live information is displayed. If "NO" in step S255, i.e., the thumbnail image 74 showing the live information is not displayed, the processor 30 repeats processing in step S255.

On the other hand, if "YES" in step S255, e.g., the thumbnail image 74 of the email tile 82 showing the live information is displayed as illustrated in FIG. 33, the processor 30 creates the next live information in step S257. For example, if the thumbnail image 92a (92) of the email tile 82 illustrated in FIG. 33 is displayed, live information indicating the next incoming email is created. The thumbnail image 92b (92) of the email tile 82 including the created live information is then stored in the thumbnail buffer 334. The live information shown by the thumbnail image 74 is updated based on the live information created in this processing when the display set is switched or when the display states of the thumbnail images 74 are updated.

Next, the processor 30 determines whether processing to update the display states of the thumbnail images 74 has been performed in step S259. This means that it is determined whether processing to update the display states of the thumbnail images 74 (S213) or to switch the display set (S233) has been performed to change the display state of the thumbnail image 74 showing the live information.

If "NO" in step S259, i.e., the display states of the thumbnail images 74 have not been changed, the processor 30 repeats processing in step S259. On the other hand, if "YES" in step S259, e.g., processing to update the display state of the thumbnail image 74 showing the live information has been performed with the thumbnail image 74 showing the live information being displayed, the processor 30 returns to processing in step S255. In this case, when the thumbnail image 74 showing the live information is displayed again, the next live information is created again. On the other hand, when the thumbnail image 74 showing the live information is not displayed, the processor 30 repeats processing in step S255.

In other embodiments, two or more folders 72 may be integrated into a single folder 72 through the pinch-in operation. In this case, examples of a name of the folder into which the two folders 72 are integrated include a name obtained by arranging names of the two folders 72, a name (e.g., a "combined folder") indicating that the two or more folders have been integrated, and the like.

When the home screen in which the folder 72 is displayed transitions to another screen or is turned off, the display state of the folder 72 at the time is stored. When the home screen is displayed next, the folder 72 is displayed in the previous state.

The home screen may further include a tile 70 corresponding to another application (e.g., SMS).

In other embodiments, the user may set any one or more thumbnail images 74 displayed in a display range of a single folder 72.

In other embodiments, the display size of the folder 72 may be changed to a size at which up to two thumbnail images 74 can be displayed, a size at which up to six thumbnail images 74 can be displayed, and a size at which nine or more thumbnail images 74 can be displayed.

In yet other embodiments, stored tiles 70 may be searched by writing characters in the display range of the folder 72 through the touch operation.

In mobile phones having a voice recognition function, the voice recognition function may be performed when the folder 72 is opened, and a function corresponding to a tile 70 designated through voice input may be performed.

A tile 70 stored in the folder 72 may be specified by inputting a gesture operation (e.g., to draw a circle) in the display range of the folder 72 through the touch operation, and a function corresponding to the tile 70 may be performed. The above-mentioned processing may not be the gesture operation, but may be an operation to shake the mobile phone 10 while touching the display range of the folder 72.

In one embodiment described above, a term "larger than" the threshold is used, but the state of being "larger than the threshold" includes the state of being "equal to or larger than the threshold". Similarly, the state of being "smaller than the threshold" includes the state of being "equal to or smaller than the threshold" and the state of being "below the threshold".

The programs used in one embodiment may be stored in an HDD of a server for data distribution, and may be distributed to the mobile phone 10 through a network. A recording medium, such as an optical disk including CD, DVD, and Blue-ray Disk (BD), USB memory, and a memory card, storing a plurality of programs may be sold or distributed. When programs downloaded through the above-mentioned server, recording medium, and the like are installed on a mobile phone having equivalent configuration to that in one embodiment, equivalent effects to those obtained in one embodiment can be obtained.

Specific numerical values appearing in the present specification are mere examples, and can appropriately be changed in accordance with the change of specifications of products and the like.

While the present disclosure has been described in detail, the foregoing description is in all aspects illustrative and not restrictive. Numerous modifications not having been described can be devised without departing from the scope of the present disclosure.

The invention claimed is:

1. An electronic device, comprising:
   a memory storing at least a first application program and a second application program;
   a display that displays a first image corresponding to the first application program and a second image corresponding to the second application program, wherein the first image has a first size and the second image has a second size which is different from the first size;
   a touch panel located on the display and configured to detect a touch operation by a user; and
   at least one processor coupled to the memory, the display and the touch panel, wherein the at least one processor is configured to:
      create a folder on the display when a first touch operation is detected while the first and second images are displayed, wherein the folder contains a plurality of thumbnail images that includes at least first and second thumbnail images, wherein the first thumbnail image corresponds to the first image and the second thumbnail image corresponds to the second image, and wherein the first thumbnail image shows live information of the first application;
      display a first subset of the plurality of thumbnail images inside the folder during a first time period in a state where the first image and the second image are stored in the folder, wherein the first subset includes at least the first thumbnail image and does not include the second thumbnail image;
      after the first time period has elapsed, automatically display a second subset of the plurality of thumbnail images inside the folder in a second time period in a state where the first image and the second image are stored in the folder, wherein the second subset includes at least the second thumbnail image and does not include the first thumbnail;
      detect a change corresponding to the live information during the second time period; and
      after the second time period has elapsed, automatically display again the first subset of the plurality of thumbnail images including the first thumbnail image, wherein an updated first thumbnail image is displayed when the change corresponding to the live information is detected.

2. The electronic device of claim 1, wherein the first size is smaller than the second size.

3. The electronic device of claim 2, wherein:
   the memory stores a third application program; and
   the at least one processor is further configured to:
      display the first image with the first size and the second image with the second size when a second touch operation on the folder is detected,
      display a third image corresponding to the third application program, and when the second touch operation is detected, display a boundary separating the third image from the first and second images.

4. The electronic device of claim 1, wherein the at least one processor is further configured to display the first subset in response to at least one second touch operation being detected while the second subset is displayed.

5. The electronic device of claim 4, wherein the at least one processor is further configured to enlarge the folder in size in response to the at least one second touch operation.

6. The electronic device of claim 1, wherein the at least one processor is further configured to, in response to detecting a second touch on the folder, display the first and second images as a group outside of the folder in their original sizes prior to being placed inside the folder.

7. The electronic device of claim 6, wherein the at least one processor is further configured to display a boundary separating the group from another image that is not associated with the folder when a third touch operation on the folder is detected.

8. The electronic device of claim 1, wherein the at least one processor is further configured to activate the first application program when a touch operation on the first image is detected while the first image is displayed outside of the folder but does not activate the first application program if the touch operation on the first image is detected while the first image is displayed inside the folder.

9. A non-transitory computer-readable storage medium storing computer-executable instructions that when executed perform a method of displaying images on a display screen of an electronic device, the electronic device being configured to execute a first application program and a second application program and having a touch panel located on the display screen, the method comprising:

displaying a first image corresponding to the first application program and a second image corresponding to the second application program, wherein the first image has a first size and the second image has a second size which is different from the first size;

detecting a touch operation by a user;

creating a folder on the display when a first touch operation is detected while the first and second images are displayed, wherein the folder contains a plurality of thumbnail images that includes at least first and second thumbnail images, wherein the first thumbnail image is corresponding to the first image and the second thumbnail image is corresponding to the second image, and wherein the first thumbnail image shows live information of the first application;

displaying a first subset of the plurality of thumbnail images inside the folder during a first time period in a state where the first image and the second image are stored in the folder, wherein the first subset includes at least the first thumbnail image and does not include the second thumbnail image;

after the first time period has elapsed, automatically displaying a second subset of the plurality of thumbnail images inside the folder in a second time period in a state where the first image and the second image are stored in the folder, wherein the second subset includes at least the second thumbnail image and does not include the first thumbnail;

detecting a change corresponding to the live information during the second time period; and after the second time period has elapsed, automatically displaying again the first subset of the plurality of thumbnail images including the first thumbnail image, wherein an updated first thumbnail image is displayed when the change corresponding to the live information is detected.

10. A method of displaying images on a display screen of an electronic device, the electronic device being configured to execute a first application program and a second application program and having a touch panel located on the display screen, the method comprising:

displaying a first image corresponding to the first application program and a second image corresponding to the second application program, wherein the first image has a first size and the second image has a second size which is different from the first size;

detecting a touch operation by a user;

creating a folder on the display when a first touch operation is detected while the first and second images are displayed, wherein the folder contains a plurality of thumbnail images that includes at least first and second thumbnail images, wherein the first thumbnail image is corresponding to the first image and the second thumbnail image is corresponding to the second image, and wherein the first thumbnail image shows live information of the first application;

displaying a first subset of the plurality of thumbnail images inside the folder during a first time period in a state where the first image and the second image are stored in the folder, wherein the first subset includes at least the first thumbnail image and does not include the second thumbnail image;

after the first time period has elapsed, automatically displaying a second subset of the plurality of thumbnail images inside the folder in a second time period in a state where the first image and the second image are stored in the folder, wherein the second subset includes at least the second thumbnail image and does not include the first thumbnail;

detecting a change corresponding to the live information during the second time period; and after the second time period has elapsed, automatically displaying again the first subset of the plurality of thumbnail images including the first thumbnail image, wherein an updated first thumbnail image is displayed when the change corresponding to the live information is detected.

* * * * *